(12) United States Patent
Miyashita et al.

(10) Patent No.: US 7,038,869 B2
(45) Date of Patent: May 2, 2006

(54) RECORDING CONTROL APPARATUS, RECORDING AND REPRODUCTION APPARATUS, AND RECORDING CONTROL METHOD

(75) Inventors: Harumitsu Miyashita, Nara (JP); Takeshi Nakajima, Nara (JP); Naohiro Kimura, Kyoto (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 134 days.

(21) Appl. No.: 10/823,264

(22) Filed: Apr. 13, 2004

(65) Prior Publication Data

US 2005/0078579 A1    Apr. 14, 2005

(30) Foreign Application Priority Data

Apr. 14, 2003    (JP) .............................. 2003-108821

(51) Int. Cl.
  G11B 5/035    (2006.01)
  G11B 7/00    (2006.01)
(52) U.S. Cl. ...................... 360/31; 360/65; 369/47.28
(58) Field of Classification Search ..................... None
  See application file for complete search history.

(56) References Cited

U.S. PATENT DOCUMENTS 6,496,316 B1* 12/2002 Hori et al. ..................... 360/65
6,549,352 B1* 4/2003 Uno et al. ..................... 360/46
6,842,303 B1* 1/2005 Ichihara et al. ............... 360/65
2002/0067677 A1* 6/2002 Miyashita et al. ........ 369/59.16
2003/0151838 A1* 8/2003 Sawaguchi et al. ........... 360/46
2004/0095862 A1* 5/2004 Nakajima et al. ........ 369/47.28

FOREIGN PATENT DOCUMENTS

| JP | 2000-200418 | 7/2000 |
| JP | 2001-109597 | 4/2001 |
| JP | 2002-196099 | 7/2002 |

* cited by examiner

Primary Examiner—David Hudspeth
Assistant Examiner—Varsha A. Kapadia
(74) Attorney, Agent, or Firm—Renner, Otto, Boisselle & Sklar, LLP

(57) ABSTRACT

A recording control apparatus includes a waveform rectification section for receiving a digital signal generated from an analog signal representing information reproduced from an information recording medium, and rectifying a waveform of the digital signal; a maximum likelihood decoding section for performing maximum likelihood decoding of the digital signal having the waveform thereof rectified, and generating a binary signal representing a result of the maximum likelihood decoding; a reliability calculation section for calculating a reliability of the result of the maximum likelihood decoding based on the digital signal having the waveform thereof rectified and the binary signal; and an adjusting section for adjusting a shape of a recording signal for recording the information on the information recording medium based on the calculated reliability.

14 Claims, 18 Drawing Sheets

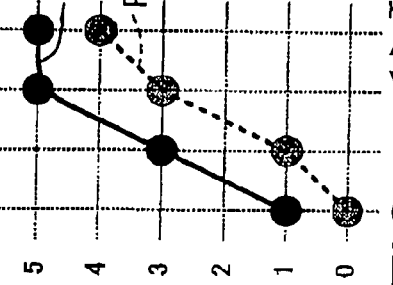

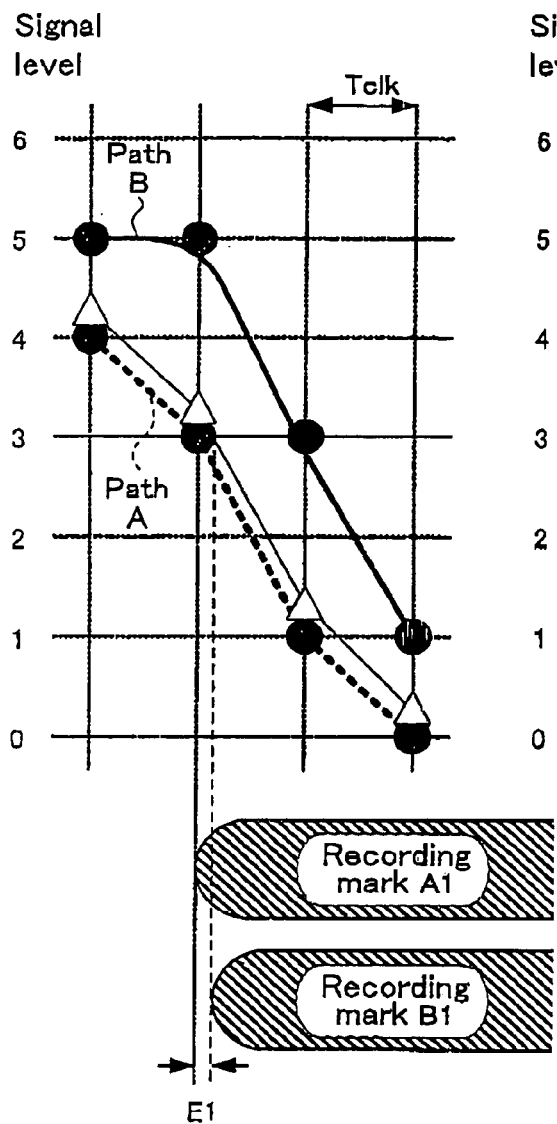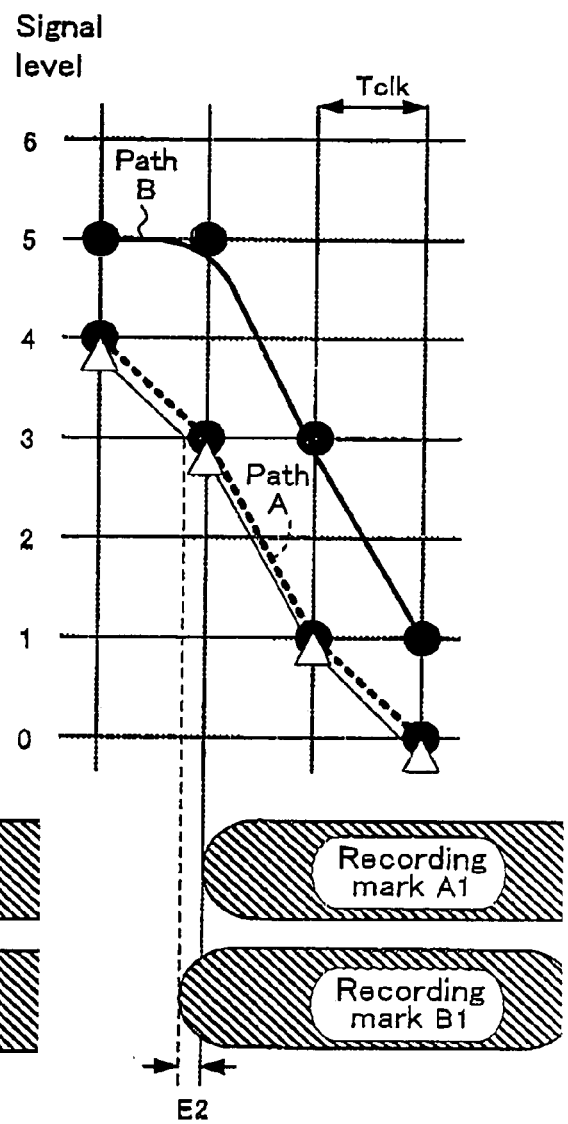

FIG.7A
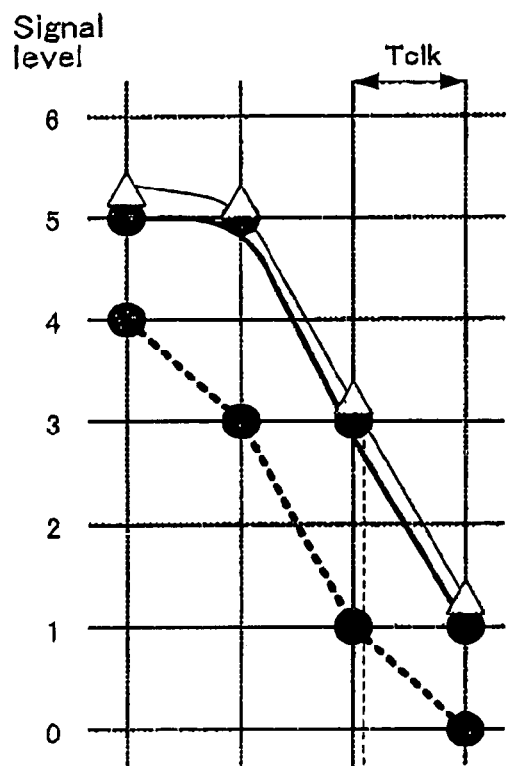
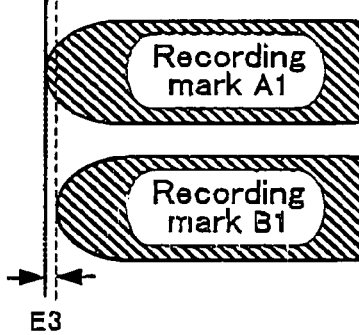
FIG.7B
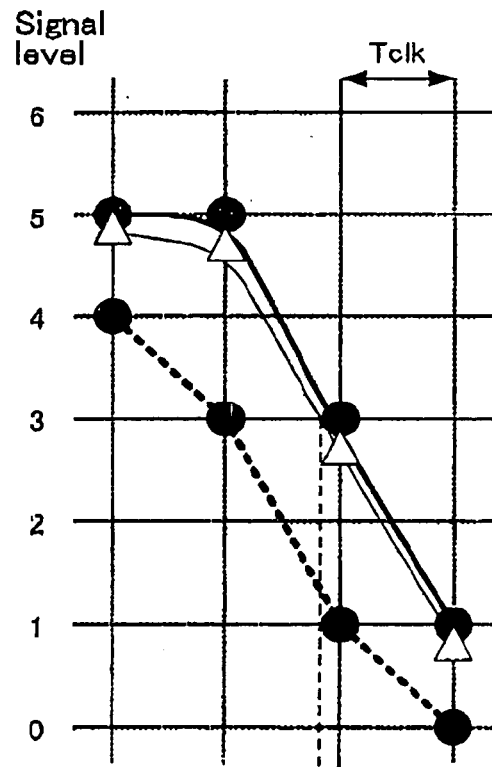
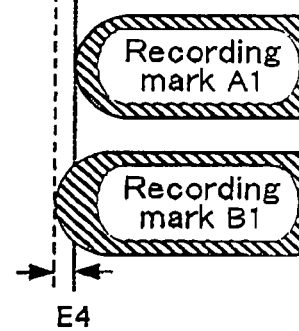

FIG.8

| Tsfp | 2Tm | 3Tm | 4Tm | 5Tm or greater |
|---|---|---|---|---|
| 2Ts | 2Ts2Tm | 2Ts3Tm | 2Ts4Tm | 2Ts5Tm |
| 3Ts | 3Ts2Tm | 3Ts3Tm | 3Ts4Tm | 3Ts5Tm |
| 4Ts | 4Ts2Tm | 4Ts3Tm | 4Ts4Tm | 4Ts5Tm |
| 5Ts or greater | 5Ts2Tm | 5Ts3Tm | 5Ts4Tm | 5Ts5Tm |

| Telp | 2Tm | 3Tm | 4Tm | 5Tm or greater |
|---|---|---|---|---|
| 2Ts | 2Tm2Ts | 3Tm2Ts | 4Tm2Ts | 5Tm2Ts |
| 3Ts | 2Tm3Ts | 3Tm3Ts | 4Tm3Ts | 5Tm3Ts |
| 4Ts | 2Tm4Ts | 3Tm4Ts | 4Tm4Ts | 5Tm4Ts |
| 5Ts or greater | 2Tm5Ts | 3Tm5Ts | 4Tm5Ts | 5Tm5Ts |

FIG.9

| Tsfp | 2Tm | 3Tm | 4Tm | 5Tm or greater |
|---|---|---|---|---|
| 2Ts |  | P3A | P1A | P1A |
| 3Ts | P3B | P1B/P4A | P1B/P2A | P1B/P2A |
| 4Ts | P4B | P2B/P4A | P2B/P2A | P2B/P2A |
| 5Ts or greater | P4B | P2B/P4A | P2B/P2A | P2B/P2A |

| Telp | 2Tm | 3Tm | 4Tm | 5Tm or greater |
|---|---|---|---|---|
| 2Ts |  | P6A | P5A | P5A |
| 3Ts | P6B | P5B/P8A | P5B/P7A | P5B/P7A |
| 4Ts | P8B | P7B/P8A | P7B/P7A | P7B/P7A |
| 5Ts or greater | P8B | P7B/P8A | P7B/P7A | P7B/P7A |

FIG.12

| Recording pattern |
|---|
| 2M3S2M4S2M5S3M2S3M3S3M4S3M5S4M<br>2S4M3S4M4S4M5S5M2S5M3S5M4S5M5S |
| 1100011000110000011100111000011110011111<br>0001111000011110000011111001111110000111110000 |

RECORDING CONTROL APPARATUS, RECORDING AND REPRODUCTION APPARATUS, AND RECORDING CONTROL METHOD

This non-provisional application claims priority under 35 U.S.C., §119(a), on Patent Application No. 2003-108821 filed in Japan on Apr. 14, 2003, the entire contents of which are hereby incorporated by reference.

BACKGROUND OF THE INVENTION

1. Field of the Invention

The present invention relates to a recording control apparatus, a recording and reproduction apparatus, and a recording control method using a maximum likelihood decoding method.

2. Description of the Related Art

In recording and reproduction apparatuses for recording original digital information on, or reproducing such information from, a portable recording medium, there can be a variance in the shape of marks formed on the medium among individual apparatuses or recording mediums even with an identical shape of recording pulse. This results in significant difference in the quality of the signal reproduced. In order to avoid reduction in the reliability due to the variance, a correction operation is performed when, for example, the recording medium is mounted. A correction operation is a control operation for optimizing the setting of characteristics of the reproduction system, the shape of the recording pulse, or the like, in order to guarantee the reliability of user data.

A general information reproduction apparatus includes a PLL circuit for extracting clock information included in a reproduction signal and identifying the original digital information based on the clock information extracted.

FIG. 14 shows a conventional optical disc drive. Light reflected by an optical disc 17 is converted into a reproduction signal by an optical head 18. The reproduction signal is shape-rectified by a waveform equalizer 19. The resultant reproduction signal is binarized by a comparator 20. Usually, the threshold of the comparator 20 is feedback-controlled such that an accumulation result of binary signal outputs is 0. A phase comparator 21 obtains phase errors between the binary signal outputs and the reproduction clocks. The phase errors are averaged by an LPF 22, and a control voltage of a VCO 23 is determined based on the processing result. The phase comparator 21 is feedback-controlled such that the phase errors output by the phase comparator 21 are always 0. In recording mediums on which information is thermally recorded, the shape of the marks formed thereon vary in accordance with the thermal interference of the mediums and recording patterns before and after the mark which is to be recorded. Therefore, a recording parameter which is optimal for the recording of each pattern needs to be set.

The above-described error detection output is an index for evaluating the recording parameter. The recording parameter is set such that the error detection output is as small as possible. Specifically, a recording compensation circuit 27 generates a pulse having a prescribed pattern based on a recording pattern which is output from a pattern generation circuit 26 using an initially set recording parameter. A laser driving circuit 28 records information on the optical disc. While information is being reproduced from a track having the prescribed pattern recorded thereon, an error detection circuit 24 accumulates absolute values of phase errors between an output from the comparator 20 and an output from the VCO 23, and thus obtains a detection signal. The detection signal is correlated with jitter between a reproduction clock and a binarized pulse edge. Recording and reproduction are repeatedly performed with different recording parameters. The recording parameter used when the detection value is minimal is determined as an optimal recording parameter.

FIG. 15 shows a specific operation of the error detection circuit 24. Here, a recording pattern having a repetition of 6T, 4T, 6T and 8T is used. The mark termination edge corresponding to a pattern of a combination of 4T marks and 6T spaces is optimized. It is assumed that a mark start edge corresponding to a pattern of a combination of 6T spaces and 8T marks, and a mark termination edge corresponding to a pattern of a combination of 8T marks and 6T spaces, are recorded with an optimal recording parameter.

When given an NRZI signal having a period shown in part (a) of FIG. 15, the recording compensation circuit 27 generates a laser waveform pulse shown in part (b) of FIG. 15. Tsfp is a parameter for setting a mark start position, and Telp is a parameter for setting a mark termination position. The laser driving circuit 28 modulates light emitting power in accordance with the pattern shown in part (b) of FIG. 15. An amorphous area is physically formed on the track as shown in part (c) of FIG. 15 by laser light. When Telp is varied as Telp1, Telp2 and Telp3, the shape of the mark formed is changed as shown in part (c) of FIG. 15. Information reproduction from the track having such marks will be discussed.

When the recording parameter at the end of the 4T mark is Telp2, which is the optimal value, a reproduction signal shown with a solid line in part (d) of FIG. 15 is obtained. The threshold value is defined such that the accumulation value of the outputs from the comparator 20 is 0. A phase difference between the output from the comparator 20 and the reproduction clock is detected, and a reproduction clock (part (e) of FIG. 15) is generated such that the accumulation value of the phase errors is 0.

In the case where the recording parameter at the end of a 4T mark is made Telp1, which is smaller than the optimal value, a reproduction signal shown in part (f) of FIG. 15 with the solid line is obtained. Since the termination edge of the 4T mark changes in a time axis direction, the threshold value Tv of the comparator 20 is greater than in the reproduction signal shown in part (d) of FIG. 15, as indicated by the one-dot chain line in part (f) of FIG. 15. Because of the change in the output from the comparator 20, the phase of the reproduction clock is advanced as compared to a reproduction clock shown in part (e) of FIG. 15 such that the accumulation value of the phase errors is 0. As a result, a reproduction clock shown in part (g) of FIG. 15 is generated.

In the case where the recording parameter at the end of a 4T mark is made Telp3, which is greater than the optimal value, a reproduction signal shown in part (h) of FIG. 15 with the solid line is obtained. Since the termination edge of the 4T mark changes in a time axis direction, the threshold value Tv of the comparator 20 is smaller than in the reproduction signal shown in part (d) of FIG. 15, as indicated by the one-dot chain line in part (h) of FIG. 15. Because of the change in the output from the comparator 20, the phase of the reproduction clock is behind as compared to a reproduction clock shown in part (e) of FIG. 15 such that the accumulation value of the phase errors is 0. As a result, a reproduction clock shown in part (i) of FIG. 15 is generated.

Measurement results of the time difference between the mark termination edge (rising edge of a reproduction signal) and the reproduction clock (so-called data-clock jitter) exhibit distributions shown in parts (j) through (l) of FIG. 15. It is assumed here that the 4T mark termination edge and the 8T mark termination edge have a variance such that both of the edges exhibit normal distributions of identical variance values.

In the case of the reproduction signal shown in part (d) of FIG. 15, and the reproduction clock shown in part (e) of FIG. 15, the time difference distribution between the output from the comparator 20 and the reproduction clock at the mark termination edge (rising edge) is as shown in part (k) of FIG. 15. The average value of the distributed values at the 4T mark termination edge, and the average value of the distributed values at the 8T mark termination edge, are each 0.

In the case where the recording parameter of the end of the 4T mark is Telp1 (smaller than the optimal value Telp2), neither the average value of the distributed values at the 4T mark termination edge, nor the average value of the distributed values at the 8T mark termination edge, is 0, but both are away from 0 by the same distance, as shown in part (j) of FIG. 15. Therefore, the total variance at the rising edge is greater than the case in part (k) of FIG. 15.

In the case where the recording parameter of the end of the 4T mark is Telp3 (greater than the optimal value Telp2), neither the average value of the distributed values at the 4T mark termination edge, nor the average value of the distributed values at the 8T mark termination edge, is 0, but both are away from 0 by the same distance, as shown in part (l) of FIG. 15. In part (j) and part (l) of FIG. 15, the distribution of the 4T mark termination edge and the distribution of the 8T mark termination edge are inverted. In this case also, the total variance at the rising edge is greater than the case in part (k) of FIG. 15.

In the case where the accumulation result of absolute values of phase errors is the error detection output, the error detection value changes as shown in part (m) of FIG. 15 in accordance with the change in the recording parameter Telp. Accordingly, the recording parameter is varied, and the recording parameter when the output from the error detection circuit 24 is minimal is determined as an optimal recording parameter.

In the above example, the recording parameter Telp at the 4T mark termination edge is optimized. For the other recording parameters, test recordings using a respective specific parameter are performed and the optimal recording parameters are obtained based on the error detection output.

FIG. 16 is a flowchart illustrating an operation for obtaining all the recording parameters in accordance with the above-described procedure. Areas of a medium on which test recordings are to be performed are accessed (S161), and the test recordings are performed while the recording parameter at the mark start edge or the mark termination edge is changed prescribed area by prescribed area (for example, sector by sector)(S163). Information is reproduced from the test recording areas, and error detection outputs are obtained area by area by which the recording parameter is changed (S164). The recording parameter at which the error detection output is minimal is determined as an optimal parameter (S165). This operation is repeated until all the optimal parameters are obtained (S162) (see Japanese Laid-Open Publications Nos. 2000-200418 and 2001-109597).

The above-described method by which the recording parameter is set such that the jitter is minimal has the following problem. In a system adopting the maximum likelihood decoding method, the probability of error generation is not necessarily minimal. Typically by the maximum likelihood decoding method, a signal pattern is estimated from a reproduction signal waveform, and a reproduction signal waveform and the estimated signal waveform are compared with each other, so that the reproduction signal is decoded into a signal having a signal pattern which has the maximum likelihood. By the maximum likelihood decoding method, the probability of error generation is lower as the difference between the reproduction signal waveform and the estimated signal waveform is smaller.

SUMMARY OF THE INVENTION

According to one aspect of the invention, a recording control apparatus includes a waveform rectification section for receiving a digital signal generated from an analog signal representing information reproduced from an information recording medium, and rectifying a waveform of the digital signal; a maximum likelihood decoding section for performing maximum likelihood decoding of the digital signal having the waveform thereof rectified, and generating a binary signal representing a result of the maximum likelihood decoding; a reliability calculation section for calculating a reliability of the result of the maximum likelihood decoding based on the digital signal having the waveform thereof rectified and the binary signal; and an adjusting section for adjusting a shape of a recording signal for recording the information on the information recording medium based on the calculated reliability.

In one embodiment of the invention, the adjusting section adjusts a shape of a prescribed portion of the recording signal.

In one embodiment of the invention, the adjusting section adjusts a position of an edge of the recording signal.

In one embodiment of the invention, the maximum likelihood decoding section performs maximum likelihood decoding using a state transition rule which is defined by a recording symbol having a minimum polarity inversion interval of 2 and an equalization system PR (C0,C1,C0).

In one embodiment of the invention, the maximum likelihood decoding section performs maximum likelihood decoding using a state transition rule which is defined by a recording symbol having a minimum polarity inversion interval of 2 and an equalization system PR (C0,C1,C1,C0).

In one embodiment of the invention, the maximum likelihood decoding section performs maximum likelihood decoding using a state transition rule which is defined by a recording symbol having a minimum polarity inversion interval of 2 and an equalization system PR (C0,C1,C2,C1,C0).

In one embodiment of the invention, the reliability calculation section calculates the reliability based on a digital signal corresponding to an end of a recording mark formed on the information recording medium and a binary signal.

In one embodiment of the invention, the adjusting section adjusts the shape of the recording signal so as to improve the reliability.

In one embodiment of the invention, the adjusting section calculates one of an accumulation value of the calculated reliability and an average value of the calculated reliability, and adjusts the shape of the recording signal based on one of the accumulation value and the average value.

In one embodiment of the invention, the adjusting section calculates one of the accumulation value of the calculated reliability and the average value of the calculated reliability for each of combinations of a recording mark length and a space length.

According to another aspect of the invention, a recording and reproduction apparatus includes a reproduction section for generating a digital signal from an analog signal representing information reproduced from an information recording medium; a waveform rectification section for receiving the digital signal and rectifying a waveform of the digital signal; a maximum likelihood decoding section for performing maximum likelihood decoding of the digital signal having the waveform thereof rectified, and generating a binary signal representing a result of the maximum likelihood decoding: a reliability calculation section for calculating a reliability of the result of the maximum likelihood decoding based on the digital signal having the waveform thereof rectified and the binary signal; an adjusting section for adjusting a shape of a recording signal for recording the information on the information recording medium based on the calculated reliability; and a recording section for recording the information on the information recording medium based on the adjusting result of the shape of the recording signal.

According to still another aspect of the invention, a recording control method includes the steps of receiving a digital signal generated from an analog signal representing information reproduced from an information recording medium, and rectifying a waveform of the digital signal; performing maximum likelihood decoding of the digital signal having the waveform thereof rectified, and generating a binary signal representing a result of the maximum likelihood decoding; calculating a reliability of the result of the maximum likelihood decoding based on the digital signal having the waveform thereof rectified and the binary signal; and adjusting a shape of a recording signal for recording the information on the information recording medium based on the calculated reliability.

In one embodiment of the invention, the step of adjusting includes the step of adjusting a shape of a prescribed portion of the recording signal.

In one embodiment of the invention, the step of adjusting includes the step of adjusting a position of an edge of the recording signal.

Thus, the invention described herein makes possible the advantages of providing a recording control apparatus, a recording and reproduction apparatus, and a recording control method for optimizing a recording parameter when recording information, such that the probability of error generation at the time of maximum likelihood decoding is minimal.

These and other advantages of the present invention will become apparent to those skilled in the art upon reading and understanding the following detailed description with reference to the accompanying figures.

BRIEF DESCRIPTION OF THE DRAWINGS

FIGS. 5A through 5H show 8 specific patterns used in an example of the present invention;

FIGS. 6A and 6B show the correlation between the reproduction waveform and the shift of a recording mark of Pattern-1 when path A is the correct path, Pa-1 being one of the 8 specific paths;

FIGS. 7A and 7B show the correlation between the reproduction waveform and the shift of a recording mark of Pattern-1 when path B is the correct path, Pa-1 being one of the 8 specific paths;

FIG. 8 is a table showing a list of recording parameters which should be optimized;

FIG. 9 is a table showing which patterns out of the 8 patterns shown in FIG. 5 is used for detecting the recording patterns shown in FIG. 8;

FIG. 12 shows a recording pattern for learning according to an example of the present invention;

DESCRIPTION OF THE PREFERRED EMBODIMENTS

Hereinafter, the present invention will be described by way of illustrative examples with reference to the accompanying drawings.

First, a method for evaluating the quality of a reproduction signal obtained by using a maximum likelihood decoding method will be described. In the following example, a recording symbol having a minimum polarity inversion interval of 2 is used, and the waveform of the signal is rectified such that the frequency characteristic of the signal at the time of recording and reproduction matches PR (1, 2, 2, 1).

Where the instant recording symbol is $b_k$, the immediately previous recording signal is $b_{k-1}$, the recording signal two times previous is $b_{k-2}$, and the recording signal three times previous is $b_{k-3}$, an ideal output value $Level_v$ matching PR (1,2,2,1) is represented by expression 1.

$$Level_v = b_{k-3} + 2b_{k-2} + 2b_{k-1} + b_k \qquad \text{expression 1}$$

where k is an integer representing the time, and v is an integer of 0 through 6.

Where the state at time k is S($b_{k-2}$, $b_{k-1}$, $b_k$), the state transition table (Table 1) is obtained,

TABLE 1

State transitions based on a combination of a recording symbol having a minimum polarity inversion interval of 2T and the equalization system of PR (1, 2, 2, 1)

| State at time k − 1<br>S($b_{k-3}$, $b_{k-2}$, $b_{k-1}$) | State at time k<br>S($b_{k-2}$, $b_{k-1}$, $b_k$) | $B_k$/$Level_v$ |
|---|---|---|
| S(0, 0, 0) | S(0, 0, 0) | 0/0 |
| S(0, 0, 0) | S(0, 0, 1) | 1/1 |
| S(0, 0, 1) | S(0, 1, 1) | 1/3 |
| S(0, 1, 1) | S(1, 1, 0) | 0/4 |
| S(0, 1, 1) | S(1, 1, 1) | 1/5 |
| S(1, 0, 0) | S(0, 0, 0) | 0/1 |
| S(1, 0, 0) | S(0, 0, 1) | 1/2 |
| S(1, 1, 0) | S(1, 0, 0) | 0/3 |
| S(1, 1, 1) | S(1, 1, 0) | 0/5 |
| S(1, 1, 1) | S(1, 1, 1) | 1/6 |

Figure 2:
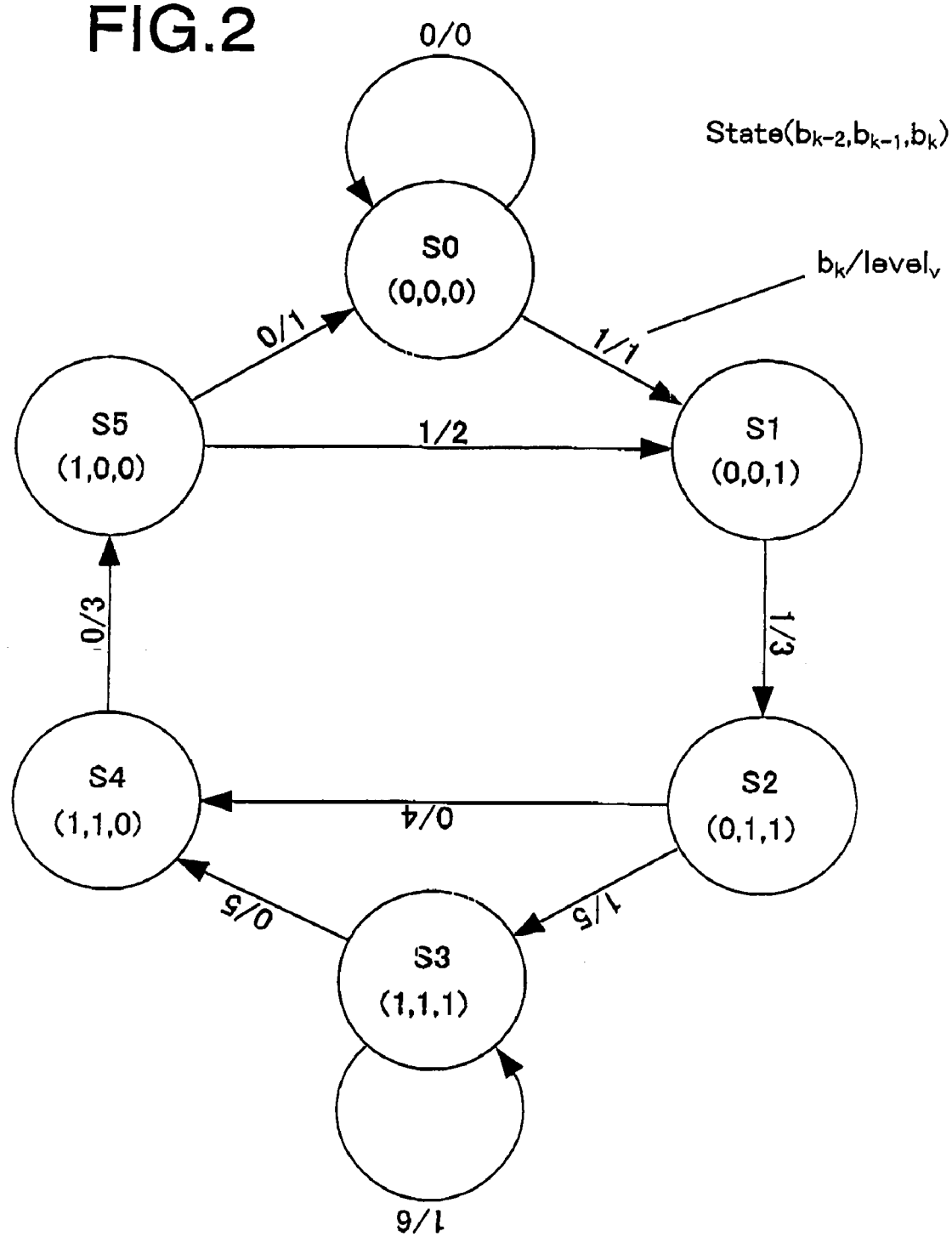
FIG. 2 shows the state transition rule based on a combination of a recording symbol having a minimum polarity inversion interval of 2 and the equalization system of PR (1,2,2,1) according to an example of the present invention.
Figure 3:
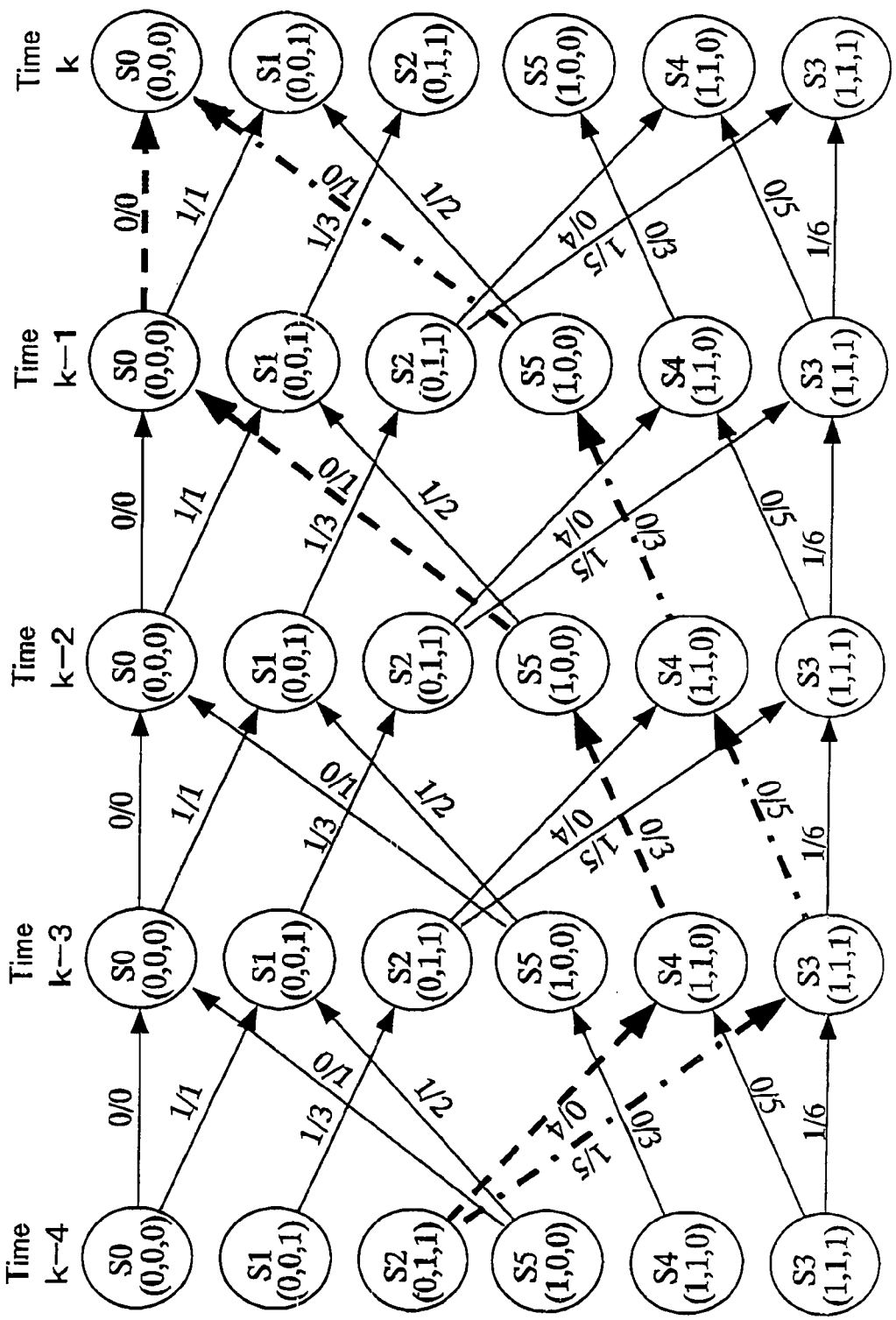
FIG. 3 shows a trellis diagram corresponding to the state transition rule shown in FIG. 2.

Where, for simplicity, state $(0,0,0)_k$ at time k is $S0_k$, state $(0,0,1)_k$ at time k is $S1_k$, state $(0,1,1)_k$ at time k is $S2_k$, state $(1,1,1)_k$ at time k is $S3_k$, state $(1,1,0)_k$ at time k is $S4_k$, and state $(1,0,0)_k$ at time k is $S5_k$, the state transition diagram shown in FIG. 2 is obtained. The state transition diagram shown in FIG. 2 represents the state transition rule defined by the minimum polarity inversion interval of 2 and the equalization system of PR (1,2,2,1). By developing this state transition diagram along the time axis, the trellis diagram shown in FIG. 3 is obtained. Now, state $S0_k$ at time k and state $S0_{k-4}$ at time k−4 will be discussed. FIG. 3 shows two states transition paths which can be present between state $S0_k$ and state $S0_{k-4}$. Where one of such state transition paths is path A, path A follows states $S2_{k-4}$, $S4_{k-3}$, $S5_{k-2}$, $S0_{k-1}$ and $S0_k$. Where the other one of such state transition paths is path B, path B follows states $S2_{k-4}$, $S3_{k-3}$, $S4_{k-2}$, $S5_{k-1}$ and $S0_k$. Here, the maximum likelihood decoding result from time k−6 to time k is ($C_{k-6}$, $C_{k-5}$, $C_{k-4}$, $C_{k-3}$, $C_{k-2}$, $C_{k-1}$, $C_k$). When the decoding result of ($C_{k-6}$, $C_{k-5}$, $C_{k-4}$, $C_{k-3}$, $C_{k-2}$, $C_{k-1}$, $C_k$)=(0,1,1,x,0,0,0) is obtained where x is 0 or 1, the state transition path A or B is estimated to have the maximum likelihood. Path A and path B have the same level of likelihood that the state at time k−4 is state $S2_{k-4}$. Therefore, which of path A or path B has the maximum likelihood can be determined by finding an accumulation value of squares of the differences between (i) the value from reproduction signal $y_{k-3}$ to reproduction signal $y_k$ from time k−3 to time k and (ii) the expected value of path A or the expected value of path B. Where the accumulation value of squares of the differences between (i) the value from reproduction signal $y_{k-3}$ to reproduction signal $y_k$ from time k−3 to time k and (ii) the expected value of path A is Pa, Pa is represented by expression 2. Where the accumulation value of squares of the differences between (i) the value from reproduction signal $y_{k-3}$ to reproduction signal $y_k$ from time k−3 to time k and (ii) the expected value of path B is Pb, Pb is represented by expression 3.

$$Pa=(y_{k-3}-4)^2+(y_{k-2}-3)^2+(y_{k-1}-1)^2+(y_k-0)^2 \quad \text{expression 2}$$

$$Pb=(y_{k-3}-5)^2+(y_{k-2}-5)^2+(y_{k-1}-3)^2+(y_k-1)^2 \quad \text{expression 3}$$

The difference between Pa and Pb (i.e., Pa−Pb), which represents the reliability of the maximum likelihood decoding result, has the following meaning. A maximum likelihood decoding section selects path A with confidence when Pa<<Pb, and selects path B with confidence when Pa>>Pb. When Pa=Pb, there is no abnormality found in selecting either path A or path B. The probability that the decoding result is correct is 50%. By finding Pa−Pb from the decoding result corresponding to a prescribed time or a prescribed number of times, distributions of Pa−Pb as shown in FIGS. 4A and 4B is obtained.

Figure 4A:
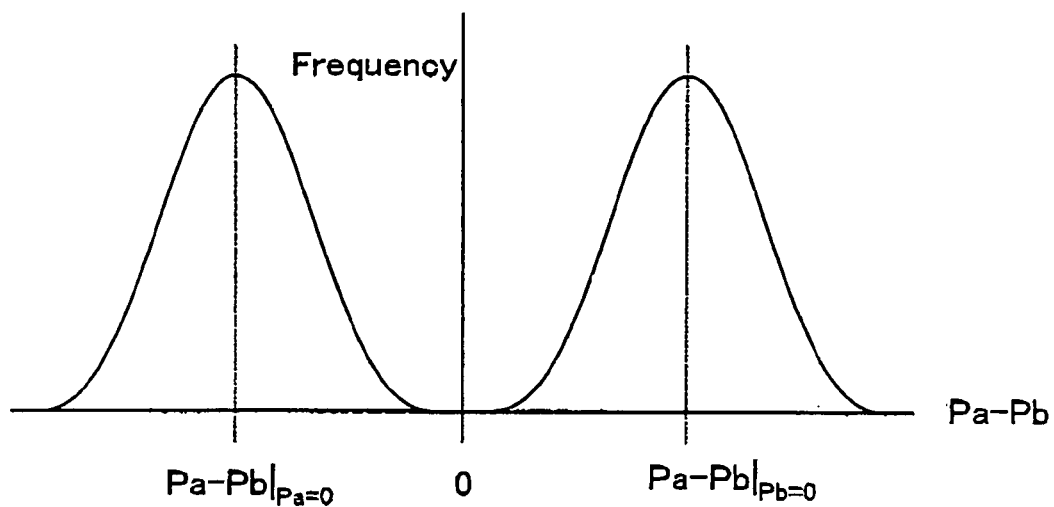
FIGS. 4A and 4B show distributions of Pa–Pb, which indicates the reliability of the maximum likelihood decoding according to an example of the present invention.

FIG. 4A shows a distribution of Pa−Pb when noise is superimposed on the reproduction signal. The distribution has two peaks of frequency. One peak is when Pa=0, and the other peak is when Pb=0. Here, the value of Pa−Pb when Pa=0 is represented as −Pstd, and the value of Pa−Pb when Pb=0 is represented as Pstd. The absolute value of Pa−Pb is calculated, and |Pa−Pb|−Pstd is obtained.

Figure 4B:
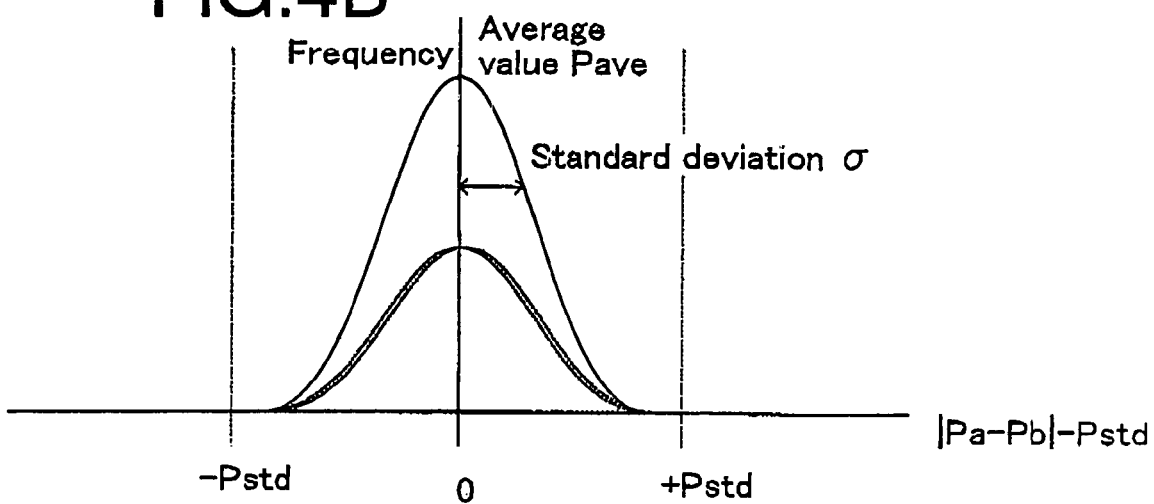

FIG. 4B shows a distribution of |Pa−Pb|−Pstd. The standard deviation σ and the average value Pave of the distribution shown in FIG. 4B are obtained. Where the distribution shown in FIG. 4B is a normal distribution and, for example, the state where the value of the reliability of decoding result |Pa−Pb| is −Pstd or less is the state where an error has occurred, the error probability P (σ, Pave) is represented by expression 4 using σ and Pave. The error probability is the probability at which the post-decoding reproduction signal is incorrect.

$$P(\sigma, \text{Pave}) = erfc\left(\frac{Pstd + \text{Pave}}{\sigma}\right) \quad \text{expression 4}$$

An error probability of the binary signal representing the maximum likelihood decoding result can be predicted from the average value Pave and the standard deviation σ a which are calculated from the distribution of Pa−Pb. Namely, the average value Pave and the standard deviation σ can be an index of the quality of the reproduction signal. In the above example, the distribution of |Pa−Pb| is assumed to be a normal distribution. In the case where the distribution is not a normal distribution, the number of times that the value of |Pa−Pb|−Pstd becomes less than or equal to a prescribed reference value is counted. The obtained number can be an index of the quality of the reproduction signal.

In the case of the state transition rule defined by the recording symbol having a minimum polarity inversion interval of 2 and the equalization system PR (1,2,2,1), there are two possible state transition paths in the following—number of state transition-patterns: 8-patterns from time k−4 to time k; 8 patterns from time k−5 to time k; and 8 patterns from time k−6 to time k. In a wider range of detection, there are Pa−Pb patterns, which is the level of reliability. It is preferable to use the reliability Pa−Pb as the index of the quality of the reproduction signal. In this case, it is not necessary to detect all the patterns; by only detecting the patterns having a high error probability, such a detection result can be used as the index which is correlated with the error probability. A pattern having a high error probability is a pattern having a small value of reliability Pa−Pb. There are 8 such patterns, where Pa−Pb=±10. These 8 patterns and Pa−Pb are summarized in Table 2.

TABLE 2

Patterns in which there can be two shortest state transition paths

| State transition | Reliability of decoding result (Pa − Pb) | |
|---|---|---|
| | Pa = 0 | Pb = 0 |
| $S2_{k-4} \to S0_k$ | −10 | +10 |
| $S3_{k-4} \to S0_k$ | −10 | +10 |
| $S2_{k-4} \to S1_k$ | −10 | +10 |
| $S3_{k-4} \to S1_k$ | −10 | +10 |
| $S0_{k-4} \to S4_k$ | −10 | +10 |
| $S5_{k-4} \to S4_k$ | −10 | +10 |
| $S0_{k-4} \to S3_k$ | −10 | +10 |
| $S5_{k-4} \to S3_k$ | −10 | +10 |

Based on the reliability Pa−Pb of the decoding results in the above-mentioned 8 patterns, express on 5 is obtained.

Pattern-1

When $(C_{k-6}, C_{k-5}, C_{k-4}, C_{k-3}, C_{k-2}, C_{k-1}, C_k) = (0,1,1,x,0,0,0)$, $Pa-Pb = (E_{k-3} - F_{k-3}) + (D_{k-2} - F_{k-2}) + (B_{k-1} - D_{k-1}) + (A_k - B_k)$ Pattern-2

When $(C_{k-6}, C_{k-5}, C_{k-4}, C_{k-3}, C_{k-2}, C_{k-1}, C_k) = (1,1,1,x,0,0,0)$, $Pa-Pb = (F_{k-3} - G_{k-3}) + (D_{k-2} - F_{k-2}) + (B_{k-1} - D_{k-1}) + (A_k - B_k)$ Pattern-3

When $(C_{k-6}, C_{k-5}, C_{k-4}, C_{k-3}, C_{k-2}, C_{k-1}, C_k) = (0,1,1,x,0,0,1)$, $Pa-Pb = (E_{k-3} - F_{k-3}) + (D_{k-2} - F_{k-2}) + (B_{k-1} - D_{k-1}) + (B_k - C_k)$ Pattern-4

When $(C_{k-6}, C_{k-5}, C_{k-4}, C_{k-3}, C_{k-2}, C_{k-1}, C_k) = (1,1,1,x,0,0,1)$, $Pa-Pb = (F_{k-3} - G_{k-3}) + (D_{k-2} - F_{k-2}) + (B_{k-1} - D_{k-1}) + (B_k - C_k)$ Pattern-5

When $(C_{k-6}, C_{k-5}, C_{k-4}, C_{k-3}, C_{k-2}, C_{k-1}, C_k) = (0,0,0,x,1,1,0)$, $Pa-Pb = (A_{k-3} - B_{k-3}) + (B_{k-2} - D_{k-2}) + (D_{k-1} - F_{k-1}) + (E_k - F_k)$ Pattern-6

When $(C_{k-6}, C_{k-5}, C_{k-4}, C_{k-3}, C_{k-2}, C_{k-1}, C_k) = (1,0,0,x,1,1,0)$, $Pa-Pb = (B_{k-3} - C_{k-3}) + (B_{k-2} - D_{k-2}) + (D_{k-1} - F_{k-1}) + (E_k - F_k)$ Pattern-7

When $(C_{k-6}, C_{k-5}, C_{k-4}, C_{k-3}, C_{k-2}, C_{k-1}, C_k) = (0,0,0,x,1,1,1)$, $Pa-Pb = (A_{k-3} - B_{k-3}) + (B_{k-2} - D_{k-2}) + (D_{k-1} - F_{k-1}) + (F_k - G_k)$ Pattern-8

When $(C_{k-6}, C_{k-5}, C_{k-4}, C_{k-3}, C_{k-2}, C_{k-1}, C_k) = (1,0,0,x,1,1,1)$, $Pa-Pb = (B_{k-3} - C_{k-3}) + (B_{k-2} - D_{k-2}) + (D_{k-1} - F_{k-1}) + (F_k - G_k)$ expression 5

Here, $Ak=(yk-0)^2$, $Bk=(yk-1)^2$, $Ck=(yk-2)^2$, $Dk=(yk-3)^2$, $Ek=(yk-4)^2$, $Fk=(yk-5)^2$, and $Gk=(yk-6)^2$. From the maximum likelihood decoding result $C_k$, Pa−Pb which fulfills expression 5 is obtained. From the distribution of Pa−Pb, the standard deviation $\sigma_{10}$ and the average value $Pave_{10}$ are obtained. Where the distribution of Pa−Pb is assumed to be a normal distribution, the error probability $P_{10}$ is represented by expression 6.

$$P_{10}(\sigma_{10}, Pave_{10}) = erfc\left(\frac{10 + Pave_{10}}{\sigma_{10}}\right) \quad \text{expression 6}$$

In the above-mentioned 8 patterns a 1-bit shift error occurs. In the other patterns, a 2- or more bit shift error occurs. A result of analysis of post-PRML processing error patterns shows that most of the errors are 1-bit shift errors. Therefore, the error probability of the reproduction signal can be estimated by expression 6. In this manner, the standard deviation $\sigma_{10}$ and the average value $Pave_{10}$ can be used as the index of the quality of the reproduction signal.

In this example of the present invention, the above-mentioned 8 patterns are detected for each recording pattern (for each combination of a mark length and a space length immediately before the mark, and for each combination of a mark length and a space length immediately after the mark). A recording parameter for optimizing the position of the edge of the recording signal is determined, with specific attention paid to the shape of the recording signal, especially the mark start edge and the mark termination edge. Paying attention only to the pattern having the minimum |Pa−Pb| value, among the reliability |Pa−Pb| of all the maximum likelihood decoding results of all the patterns, means to pay attention only to the edge of a recording mark. As described above, a pattern having a small value of Pa−Pb has a high error probability. This means that by partially optimizing the position of the edge of a recording mark so as to improve the reliability of the maximum likelihood decoding result, the entire recording parameter is optimized. A method for optimizing the position of the edge of a recording mark will be described hereinafter.

Figure 15:
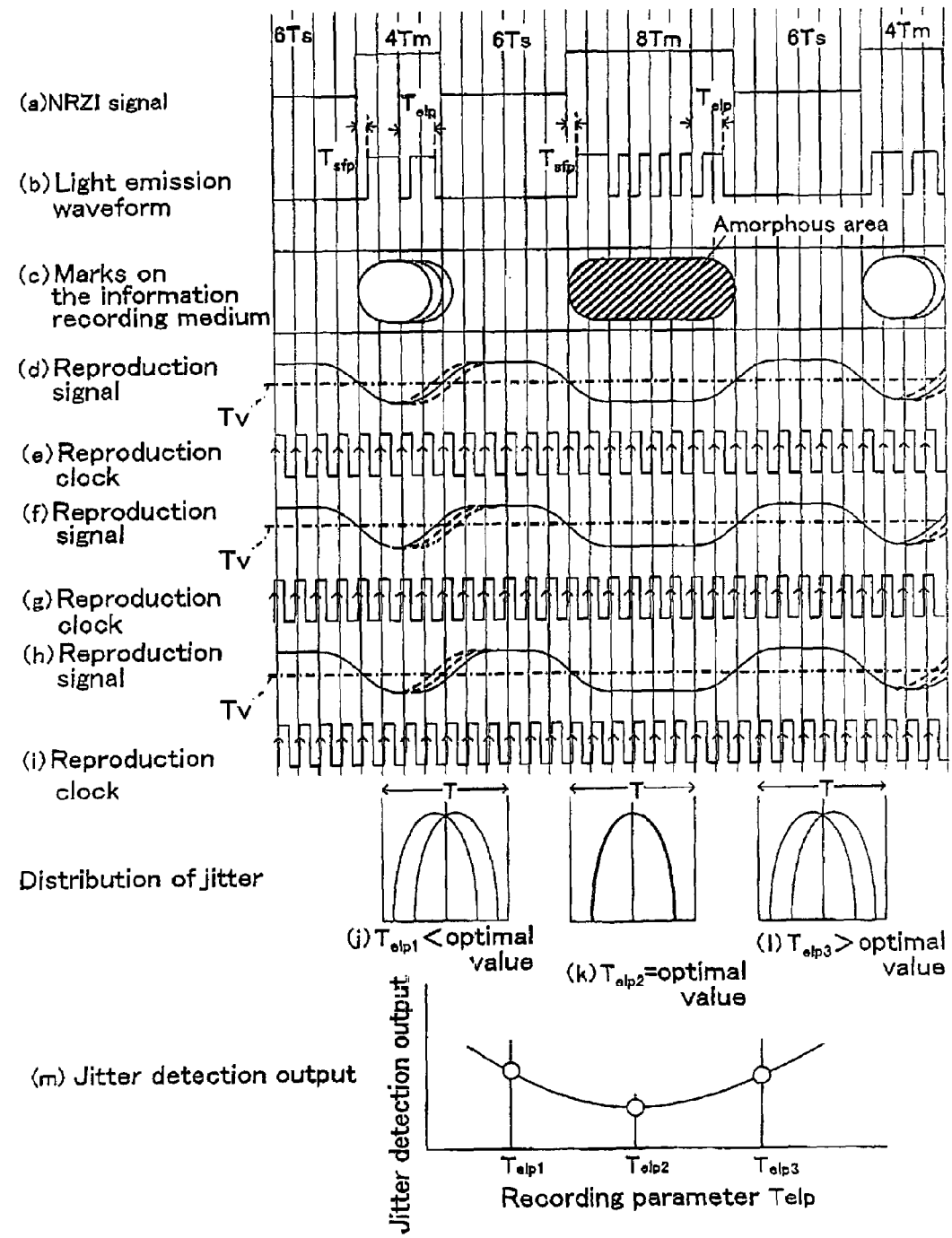
FIG. 15 is a timing diagram illustrating an operation of a conventional error detection circuit.
Figure 16:
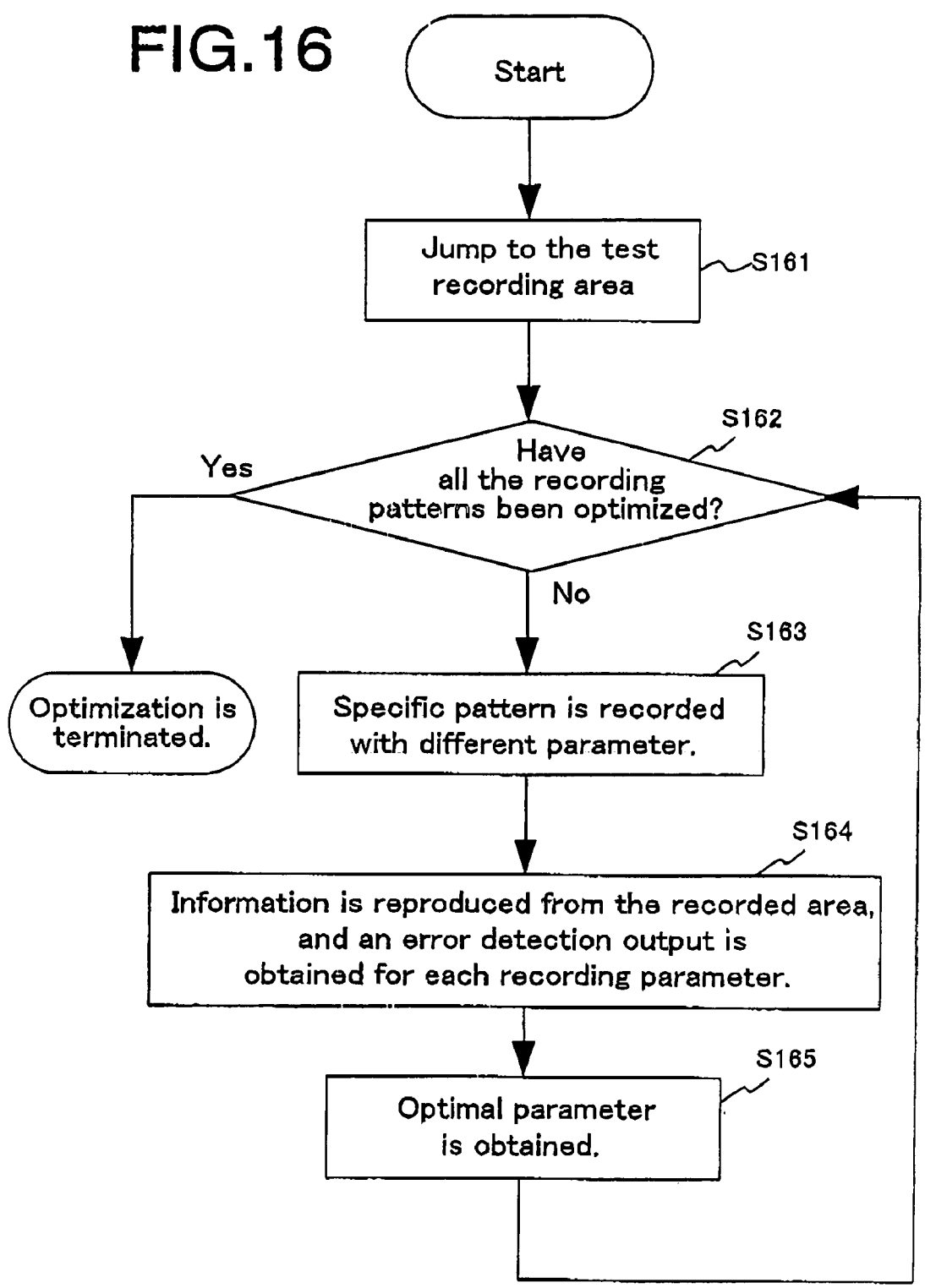
FIG. 16 is a flowchart illustrating a conventional operation for obtaining a recording parameter.

FIGS. 5A through 5H show sample values of 8 patterns (Pattern-1 through Pattern-8). The horizontal axis represents time. One scale represents one channel clock period (Tclk). The vertical axis represents signal level (0 through 6). The dotted line represents path A, and the solid line represents path B. Each sample value corresponds to the expected value Level$_y$ 0 through 6 of the maximum likelihood decoding described above with reference to Table 1. As shown in part (c) and part (d) of FIG. 15, a recorded portion (amorphous area) is represented as having a signal level below the threshold value of the comparator since the light amount reflected by the recorded portion is lower than the light amount reflected by the other portions. An unrecorded portion (non-amorphous area) is represented as having a signal level above the threshold value of the comparator. The 8 patterns shown in FIGS. 5A through 5H each correspond to a reproduction waveform of a border (mark start edge or mark termination edge) between the recorded portion (mark) and an unrecorded portion (space). Pattern-1, Pattern-2, Pattern-3, and Pattern-4 each correspond to a mark start edge. Pattern-5, Pattern-6, Pattern-7, and Pattern-8 each correspond to a mark termination edge.

A method for detecting a shift of the mark start edge will be described using Pattern-1 as an example.

FIGS. 6A and 6B show the correlation between the reproduction waveform and the shift of a recording mark of Pattern-1. In FIGS. 6A and 6B, "Δ" represents an input signal. Path A represented by the dotted line is a correct state transition path. The input signal is generated based on a recording mark B1. A recording mark A1 has an ideal position of the mark start edge. In FIG. 6A, the position of the mark start edge of the recording mark B1 is behind the ideal position. The sample value of the input signal ($y_{k-3}$, $y_{k-2}$, $y_{k-1}$, $y_k$) is (4.2, 3.2, 1.2, 0.2). From expressions 2 and 3, a distance Pa between the path A and the input signal, and a distance Pb between the path B and the input signal, are obtained by expressions 7 and 8, respectively.

$$Pa=(4.2-4)^2+(3.2-3)^2+(1.2-1)^2+(0.2-0)^2=0.16 \quad \text{expression 7}$$

$$Pb=(4.2-5)^2+(3.2-5)^2+(1.2-3)^2+(0.2-1)^2=7.76 \quad \text{expression 8}$$

The amount and direction of the shift of the mark start edge are obtained by finding |Pa−Pb|−Pstd by expression 9.

$$E1=|Pa-Pb|-Pstd=|0.16-7.76|-10=-2.4 \quad \text{expression 9}$$

The absolute value of E1 obtained by expression 9 is the shift amount, and the sign of E1 is the shift direction. In the case of the recording mark B1 in FIG. 6A, E1=−2.4. This means that the position of the mark start edge of the recording mark B1 is shifted rearward from the reference by 2.4.

In FIG. 6B, the position of the mark start edge of the recording mark B1 is advanced to the ideal position. The sample value of the input signal ($y_{k-3}$, $y_{k-2}$, $y_{k-1}$, $y_k$) is (3.8, 2.8, 0.8, −0.2). E2 is obtained by E2=|Pa−Pb|−Pstd. E2 is 2.4. This means that the position of the mark start edge of the recording mark B1 is shifted forward from the reference by 2.4.

FIGS. 7A and 7B show the correlation between the reproduction waveform and the shift of a recording mark of Pattern-1. In FIGS. 7A and 7B, path B represented by the solid line is a correct state transition path. Here also, "Δ" represents an input signal. The input signal is generated based on a recording mark B1. A recording mark A1 has an ideal position of the mark start edge. In FIG. 7A, the position of the mark start edge of the recording mark B1 is behind the ideal position. The sample value of the input signal ($y_{k-3}$, $y_{k-2}$, $y_{k-1}$, $y_k$) is (5.2, 5.2, 3.2, 1.2). E3 is obtained by E3=|Pa−Pb|−Pstd. E3 is 2.4. This means that the position of the mark start edge of the recording mark B1 is shifted rearward from the reference by 2.4. In FIG. 7B, the position of the mark start edge of the recording mark B1 is advanced to the ideal position. The sample value of the input signal ($y_{k-3}$, $y_{k-2}$, $y_{k-1}$, $y_k$) is (4.8, 4.8, 2.8, 0.8). E4 is obtained by E4=|Pa−Pb|−Pstd. E4 is −2.4. This means that the position of the mark start edge of the recording mark B1 is shifted forward from the reference by 2.4.

Comparing the case of FIGS. 6A and 6B in which path A is the correct state transition path and the case of FIGS. 7A and 7B in which path B is the correct state transition path, the sign of the symbol representing the shift direction is opposite. The sign of the symbol relies on the relationship between the expected value series of the correct state transition path and, the input signal series, and the relationship between the expected value series of the other candidate path and the input signal series. When the error between the input signal and the expected value of the incorrect candidate path is large as in FIG. 6B and FIG. 7A, the value obtained by expression 9 has a positive sign. Namely, as the difference between the input signal and the expected value of the incorrect candidate path becomes larger, the error probability of the maximum likelihood decoding is lower. The shift direction of the position of the mark start edge of the recording mark can be detected in consideration of this. When path A is the correct state transition path in Pattern-1, Pattern-1 is used for detecting the start edge of the recording mark of a combination of a 2T space and a 4T or longer mark. When path B is the correct state transition path in Pattern-1, Pattern-1 is used for detecting the start edge of the recording mark of a combination of a 3T space and a 3T or longer mark. Using the above-described method, an accumulation value or an average value of each recording pattern (i.e., each mark length/space length combination) is obtained, and a recording parameter is set such that the shift amount of the position of the start edge and termination edge is close to 0. Thus, a recording control optimal for the maximum likelihood decoding method is realized.

Optimization of a recording parameter will be described. The minimum polarity inversion interval of a recording symbol is represented by m (in this example, m=2). The position of the start edge of a recording mark formed on an information recording medium may rely on the length of the space immediately before the recording mark and the length of the recording mark itself. For example, when the length of the space immediately before the recording mark is mT to (m+b)T, the position of the mark start edge of the recording mark relies on the length of the space immediately before the recording mark. When the length of the space immediately before the recording mark is greater than (m+b)T, the position of the mark start edge of the recording mark does not rely on the length of the space immediately before the recording mark. When the length of the recording mark itself to mT to (m+a)T, the position of the mark start edge of the recording mark relies on the length of the recording mark itself. When the length of the recording mark itself is greater than (m+a)T, the position of the mark start edge of the recording mark does not rely on the length of the recording mark itself.

The position of the termination edge of a recording mark formed on an information recording medium may rely on the length of the space immediately after the recording mark and the length of the recording mark itself. For example, when the length of the recording mark itself is mT to (m+a)T, the position of the mark termination edge of the recording mark relies on the length of the recording mark itself. When the length of the recording mark itself is greater than (m+a)T, the position of the mark termination edge of the recording mark does not rely on the length of the recording mark itself. When the length of the space immediately after the recording mark is mT to (m+b)T, the position of the mark termination edge of the recording mark relies on the length of the space immediately after the recording mark. When the length of the space immediately after the recording mark is greater than (m+b)T, the position of the mark termination edge of the recording mark does not rely on the length of the space immediately after the recording mark. In the above, "a" and "b" are each an integer of 0 or greater, and the minimum polarity inversion interval of the recording symbol is greater than m+a and m+b.

In consideration of the position of the mark start edge and the position of the mark termination edge of a recording mark, the optimization of the parameter Tsfp at the mark start edge needs to be performed on a recording mark adjacent to a space having a length of (m+b)T or less. The optimization of the parameter Telp at the mark termination edge needs to be performed on a recording mark having a length of (m+a)T or less. Where, for simplicity, m=3 and a=b=3, the parameter needs to be optimized for 32 recording patterns shown in FIG. 8. In FIG. 8, 2Ts2Tm, for example, means a pattern in which a 2T space exists immediately before a 2T mark.

FIG. 9 shows which pattern out of the 8 patterns (Pattern-1 through Pattern-8) is used for detecting the recording patterns (i.e., edge patterns) shown in FIG. 8. For example, the shift amount of the signal corresponding to a 2Ts3Tm recording pattern (FIG. 8) is detected using P3A (FIG. 9). P3A is Pattern-3 in which path A is the correct state transition path. The shift amount of the signal of a 3Ts3Tm recording pattern (FIG. 8) is detected using P1B or P4A (FIG. 9). P1B is a Pattern-1 in which path B is the correct state transition path. P4A is a Pattern-4 in which path A is the correct state transition path. As can be appreciated from the above, a method for controlling a recording parameter optimal for the maximum likelihood decoding method is to change the recording parameter such that the shift amount of the signal corresponding to every recording pattern shown in FIG. 9 is close to 0.

In FIG. 9, the shift amount of the signal corresponding to each of a 2Ts2Tm recording pattern (a 2T space is present immediately before a 2T mark) and a 2Tm2Ts (a 2T space is present immediately after a 2T mark) cannot be detected by any of the 8 patterns described above. Thus, the shift amount needs to be optimized by another method. However, the 2Ts2Tm recording pattern and the 2Tm2Ts recording pattern have a relatively large value of reliability Pa−Pb and thus are not included in the above 8 patterns. In other words, at the mark start edge or mark termination edge of the recording mark of each of the 2Ts2Tm recording pattern and the 2Tm2Ts recording pattern, the error probability is low; it is not necessary to strictly optimize the recording parameter of these recording patterns. Therefore, an appropriate initial value may be used as the recording parameter instead of optimizing such shift amounts for each information recording medium. Alternatively, the 2Ts2Tm recording pattern and the 2Tm2Ts recording pattern may be optimized such that the accumulation value of the phase errors of the reproduction signal is minimal.

Figure 1:
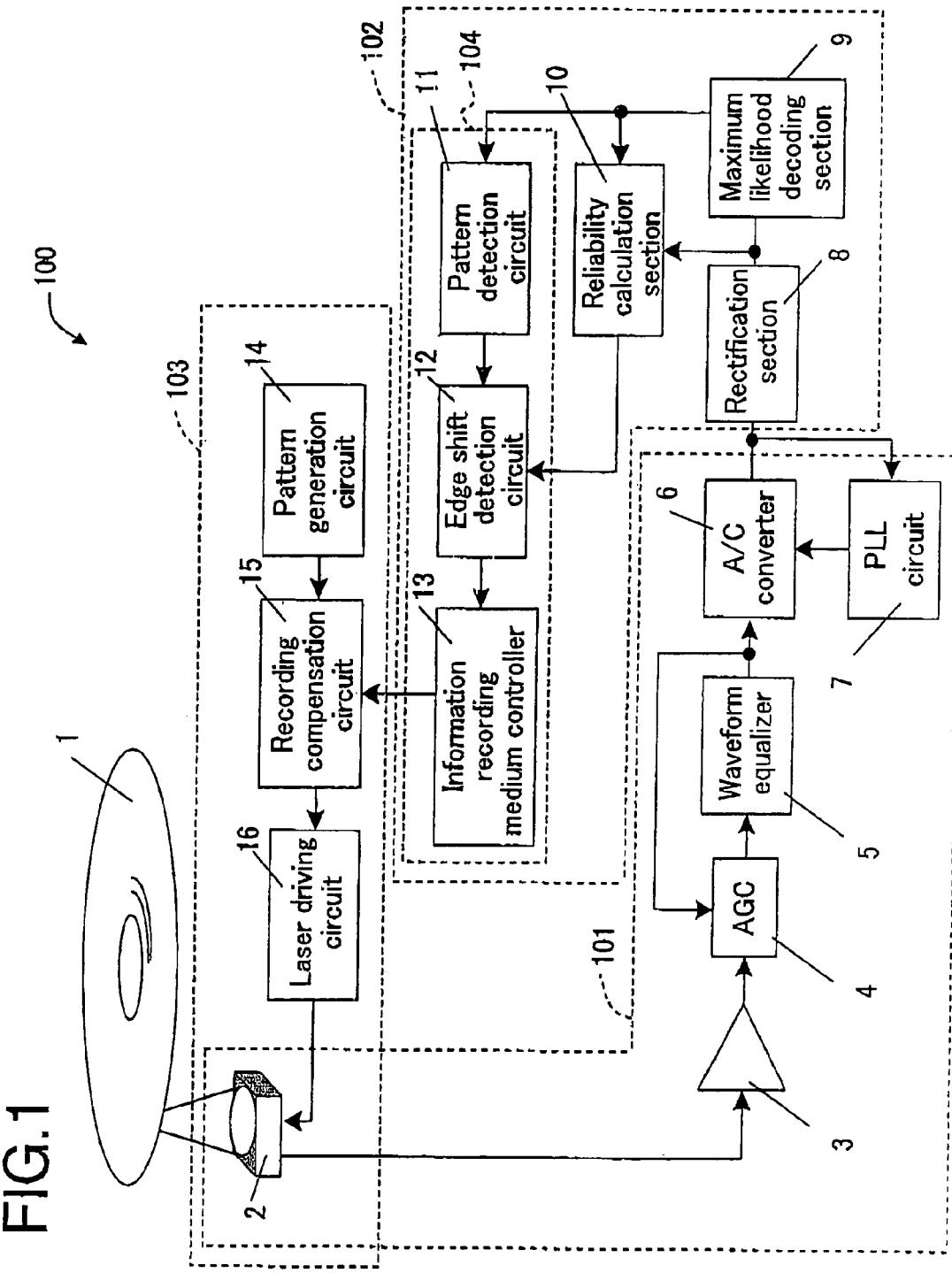
FIG. 1 shows a structure of a recording and reproduction apparatus according to an example of the present invention.

FIG. 1 shows a recording and reproduction apparatus 100 according to an example of the present invention. The recording and reproduction apparatus 100 executes the above-described method for optimizing recording parameters.

The recording and reproduction apparatus 100 includes a reproduction section 101, a recording control device 102, and a recording section 103. On the recording and reproduction apparatus 100, an information recording medium 1 can be mounted. The information recording medium 1 is usable for optical information recording and reproduction, and is, for example, an optical disc.

The reproduction section 101 includes an optical head section 2, a preamplifier 3, an AGC 4, a waveform equalizer 5, an A/D converter 6, and a PLL circuit 7. The reproduction section 101 generates a digital signal from an analog signal representing information reproduced from the information recording medium 1.

The recording control section 102 includes a rectification section 8, a maximum likelihood decoding section 9, a reliability calculation section 10, and an adjusting section 104. The adjusting section 104 includes a pattern detection circuit 11, an edge shift detection circuit 12, and an information recording medium controller 13. The recording control section 102 is produced as, for example, a semiconductor chip.

The rectification section 8 is, for example, a digital filter, and receives the digital signal generated by the reproduction section 101 and rectifies the waveform of the digital signal such that the digital signal has a prescribed equalizing characteristic.

The maximum likelihood decoding section 9 is, for example, a Veterbi decoding circuit, and performs maximum likelihood decoding of the digital signal having the waveform thereof rectified by the rectification section 8 and generates a binary signal representing the result of the maximum likelihood decoding.

The reliability calculation section 10 is, for example, a differential metric detection circuit, and calculates the reliability of the result of the maximum likelihood decoding based on the digital signal having the waveform thereof rectified by the rectification section 8 and the binary signal output from the maximum likelihood decoding section 9. In one embodiment of the present invention, the reliability calculation section 10 calculates the reliability of the result of the maximum likelihood decoding based on digital signals corresponding to a mark start edge and a mark termination edge of a recording mark formed on the information recording medium 1 and binary signals.

The adjusting section 104 adjusts the shape of prescribed portions of a recording signal for recording information on the information recording medium 1 based on the reliability calculated by the reliability calculation section 10. The adjusting section 104 adjusts, for example, the positions of edges of the recording signal. The adjustment of the shape of the recording signal by the adjusting section 104 is performed such that the reliability of the result of the maximum likelihood decoding is improved. The information recording medium controller 13 is, for example, an optical disc controller.

The recording section 103 includes a pattern generation circuit 14, a recording compensation circuit 15, a laser driving circuit 16, and an optical head section 2. The recording section 103 records information on the information recording medium 1 based on the adjusting result of the shape of the recording signal. In this example, the optical head section 2 is included both in the reproduction section 101 and the recording section 103, and has both the functions of a recording head and a reproduction head. The recording head and the reproduction head may be separately provided. An operation of the recording and reproduction apparatus 100 will be described in detail below.

The optical head section 2 generates an analog reproduction signal representing information which is read from the information recording medium 1. The analog reproduction signal is amplified and AC-coupled by the preamplifier 3 and then is input to the AGC 4. The AGC 4 adjusts the gain of the analog reproduction signal such that the output from the waveform equalizer 5, which will later process the signal, has a constant amplitude. The analog reproduction signal which is output from the AGC 4 has the waveform thereof rectified by the waveform equalizer 5. The resultant analog reproduction signal is output to the A/D converter 6. The A/D converter 6 samples the analog reproduction signal in synchronization with a reproduction clock which is output from the PLL circuit 7. The PLL circuit 7 extracts the reproduction clock from a digital reproduction signal obtained by sampling performed by the A/D converter 6.

The digital reproduction signal generated by sampling performed by the A/D converter 6 is input to the rectification section 8. The rectification section 8 adjusts the frequency of the digital reproduction signal (i.e., adjusts the waveform of the digital reproduction signal), such that the frequency characteristic of the digital reproduction signal is the characteristic assumed by the maximum likelihood decoding section 9 (in this example, PR (1,2,2,1) equalization characteristic) at the time of recording and reproduction.

The maximum likelihood decoding section 9 performs maximum likelihood decoding of the digital reproduction signal having the waveform thereof rectified by the rectification section 8, and thus generates a binary signal. The reliability calculation section 10 receives the digital reproduction signal having the waveform thereof rectified by the rectification section 8 and the binary signal. The reliability calculation section 10 identifies the state transition from the binary signal, and obtains |Pa−Pb|−Pstd (see expression 9; hereinafter, referred to simply as "Pabs") which represents the reliability of the decoding result, based on the identification result and the branch metric. Based on the binary signal, the pattern detection circuit 11 generates a pulse signal for assigning the above-mentioned 8 patterns (Pattern-1 through Pattern-8) for each recording pattern shown in FIG. 9, and outputs the pulse signal to the edge shift detection circuit 12. The edge shift detection circuit 12 accumulatively adds the reliability Pabs pattern by pattern, and obtains a shift of the recording compensation parameter from the optimal value (i.e., an edge shift). The information recording medium controller 13 changes the recording parameter (waveform of the recording signal) which is determined to be changed based on the edge shift amount added pattern by pattern. The pattern generation circuit 14 outputs a recording compensation leaning pattern.

Based on the recording parameter from the information recording medium controller 13, the recording compensation circuit 15 generates a laser light emission waveform pattern in accordance with the recording compensation leaning pattern. In accordance with the resultant light emission waveform pattern, the laser driving circuit 16 controls a laser light emission operation of the optical head section 2.

Figure 10:
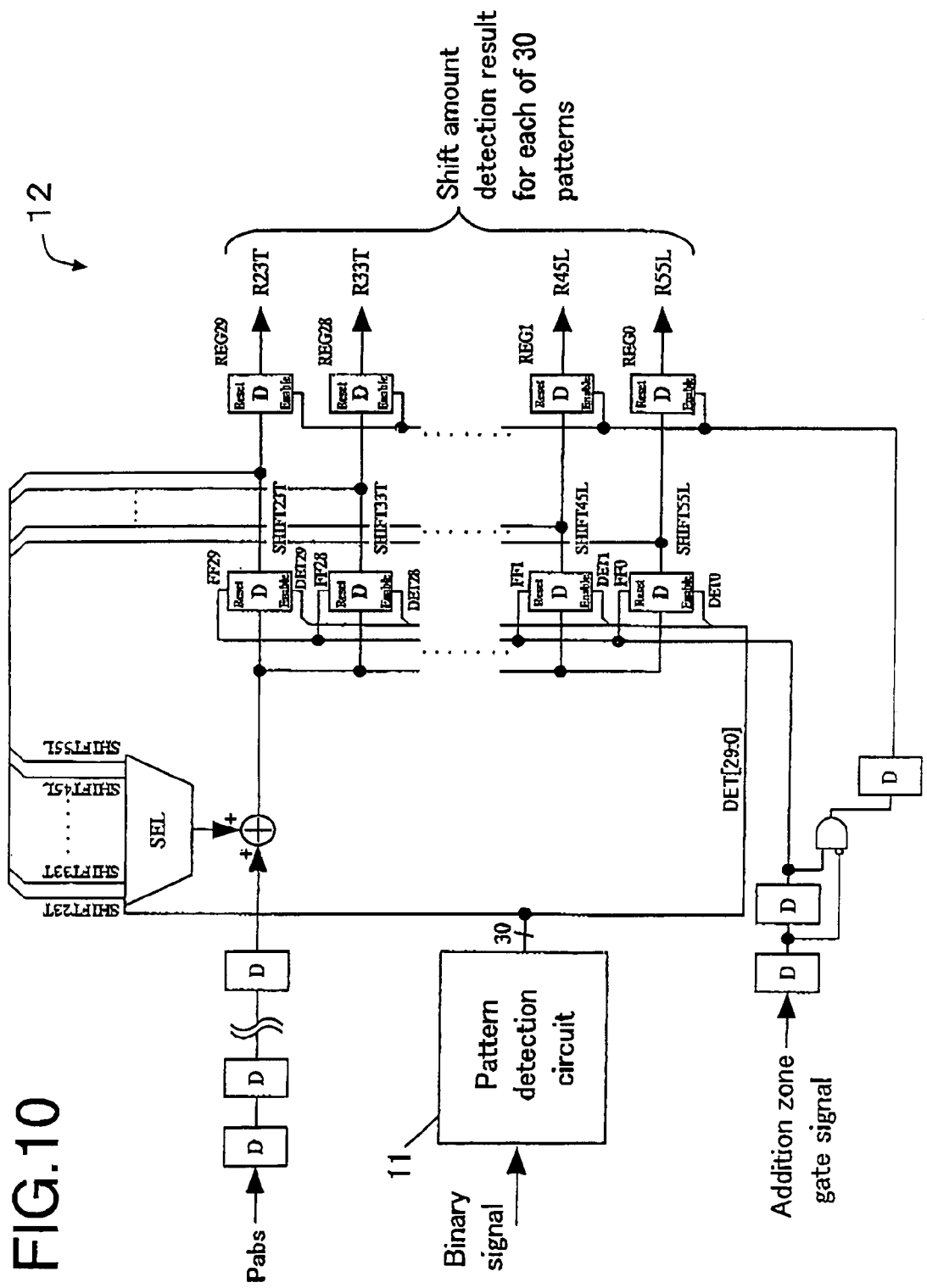
FIG. 10 shows an edge shift detection circuit according to an example of the present invention.

Next, an operation of the edge shift detection circuit 12 in this example will be described in detail. FIG. 10 shows the pattern detection circuit 11 and the edge shift detection circuit 12. The edge shift detection circuit 12 receives a pattern detection result obtained by the pattern detection circuit 11 and the reliability Pabs calculated by the reliability calculation section 10. The reliability Pabs data input to the edge shift detection circuit 12 is delayed by a flip-flop (FF) in consideration of the delay caused by the pattern detection circuit 11. The reliability Pabs data corresponding to the pattern detection output and the detection output point are input to an adder, and the pattern detection result is input to a selector. The selector selects the accumulation result obtained up to that point in accordance with the detection pattern and inputs the selected-result to the adder. The adder adds the accumulation result and the newly input reliability Pabs data, and outputs the addition result. A specific register corresponding to the detection pattern, when receiving an enable signal, stores the addition result.

Figure 11:
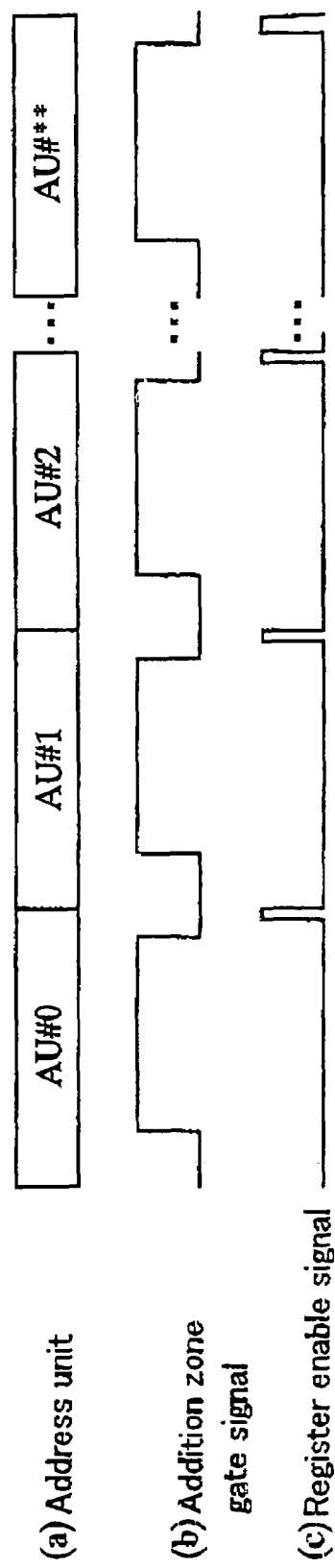
FIG. 11 is a timing diagram illustrating an operation of the edge shift detection circuit shown in FIG. 10.

For example, in the case wherein formation is recorded on an information recording medium in which information is managed address by address, it is assumed to use an addition zone gate signal and a register enable signal shown in part (b) and part (c) of FIG. 11. Part (a) of FIG. 11 shows an address unit. In the case where test recording is performed in a user area address by address so as to obtain an edge shift amount, a control needs to be performed for defining an addition zone. When the addition zone gate signal shown in part (b) of FIG. 11 is input to the edge shift detection circuit 12, the addition zone gate signal passes through the two-stage flip-flop shown in FIG. 10 and is input to flip-flops FF29 through FF0. The flip-flops are reset in a low zone of the addition zone gate signal shown in part (b) of FIG. 11, and the addition result is stored in a high zone. The register enable signal shown in part (c) of FIG. 11 is generated from the addition zone gate signal. The register enable signal is for storing the addition result to registers REG29 through REG0 at the end of the addition zone gate signal. Data representing the edge shift amount address by address is stored in the registers REG29 through REG0. The edge shift detection circuit 12, owing to such a circuit configuration, can obtain all the edge shift amounts necessary for optimization of the recording parameter using one adder.

In the example shown in FIG. 10, the generation frequency of the recording patterns varies in accordance with the combination of the prescribed length of marks and spaces required for optimization of the recording parameter, among the recording patterns used for test recording (e.g., random patterns). The 30 edge shift amounts detected (R23T, R33T, . . . R45L, R55L) rely on the generation frequency of the recording patterns.

The PLL circuit 7 shown in FIG. 1 automatically detects a threshold value of a slicer (not shown) using a DC component (a low frequency component included in the reproduction signal) and synchronizes the reproduction signal and the reproduction clock signal. Accordingly, it is preferable that the amount of the DC component included in the test recording pattern is as small as possible, such that the feedback control does not influence the clock generation performed by the PLL circuit 7. In consideration of the time required for optimization and precision of optimization, it is preferable to obtain a detection result having a high precision with a minimum possible recording area. Therefore, the following recording pattern is required: a recording pattern which has mark length/space length combinations required for optimization of the recording parameter at the same frequency, in which the code includes no DC component (DSV), and in which the generation frequency, per unit area, of the mark length/space length combinations required for optimization of the recording parameter to high. An example of such a recording pattern is shown in FIG. 12.

In FIG. 12, 2M represents a 2T mark, and 2S represents a 2T space. In this example, each of 30 patterns of combinations of 2T through 5T marks and 2T through 5T spaces is generated once in a 108-bit recording pattern. The number of symbols "0" and the number of symbols "1" including the 108-bit recording pattern are both 54, and the DSV in the recording pattern is 0. By applying this recording pattern to the edge shift detection circuit 12 in FIG. 10, each pattern can be detected the same number of times. Thus, a more accurate shift amount detection result is obtained. In this example, it is assumed that 5T or longer marks or 5T or longer spaces can be recorded with the same recording parameter.

Figure 13:
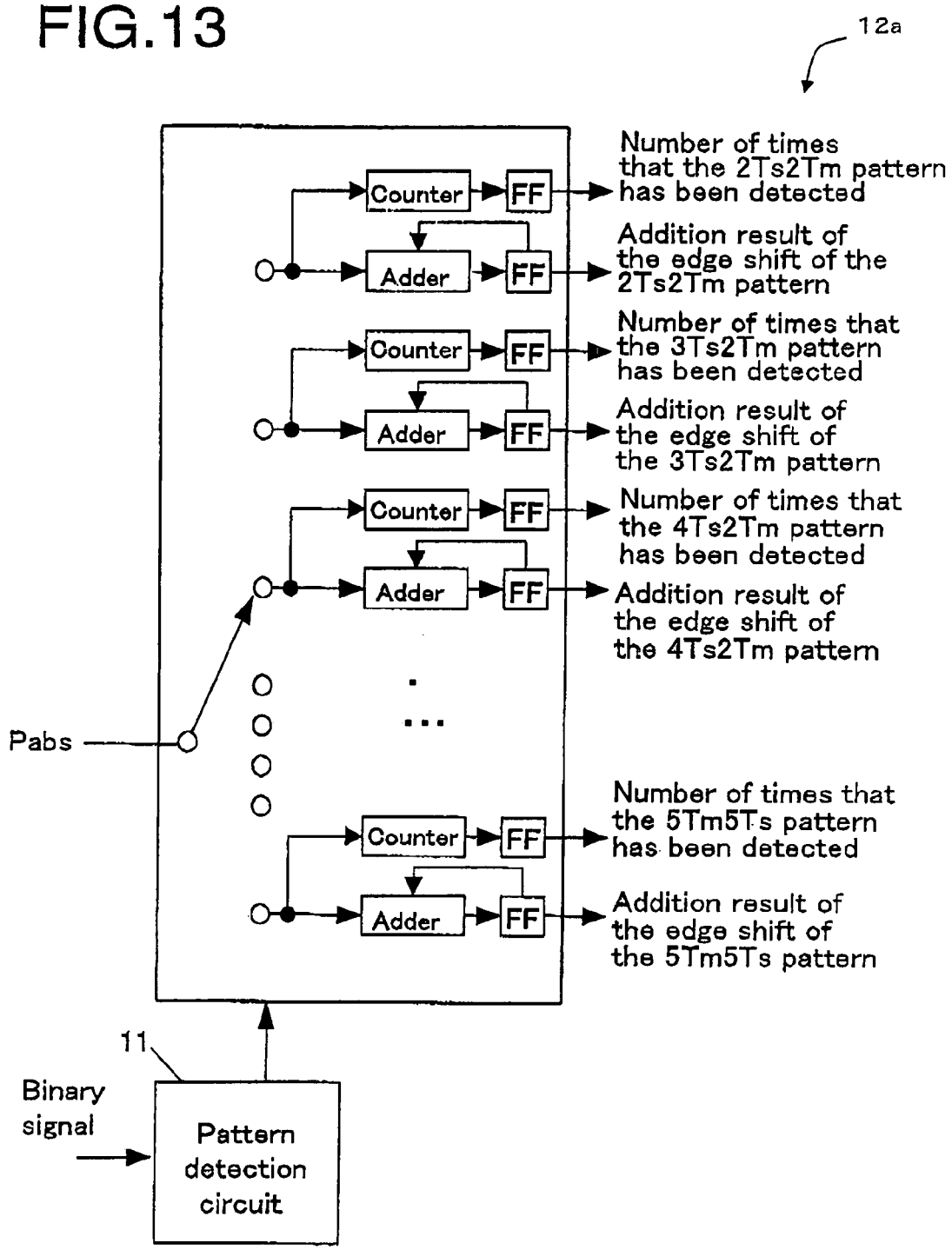
FIG. 13 shows another edge shift detection circuit according to an example of the present invention.
Figure 14:
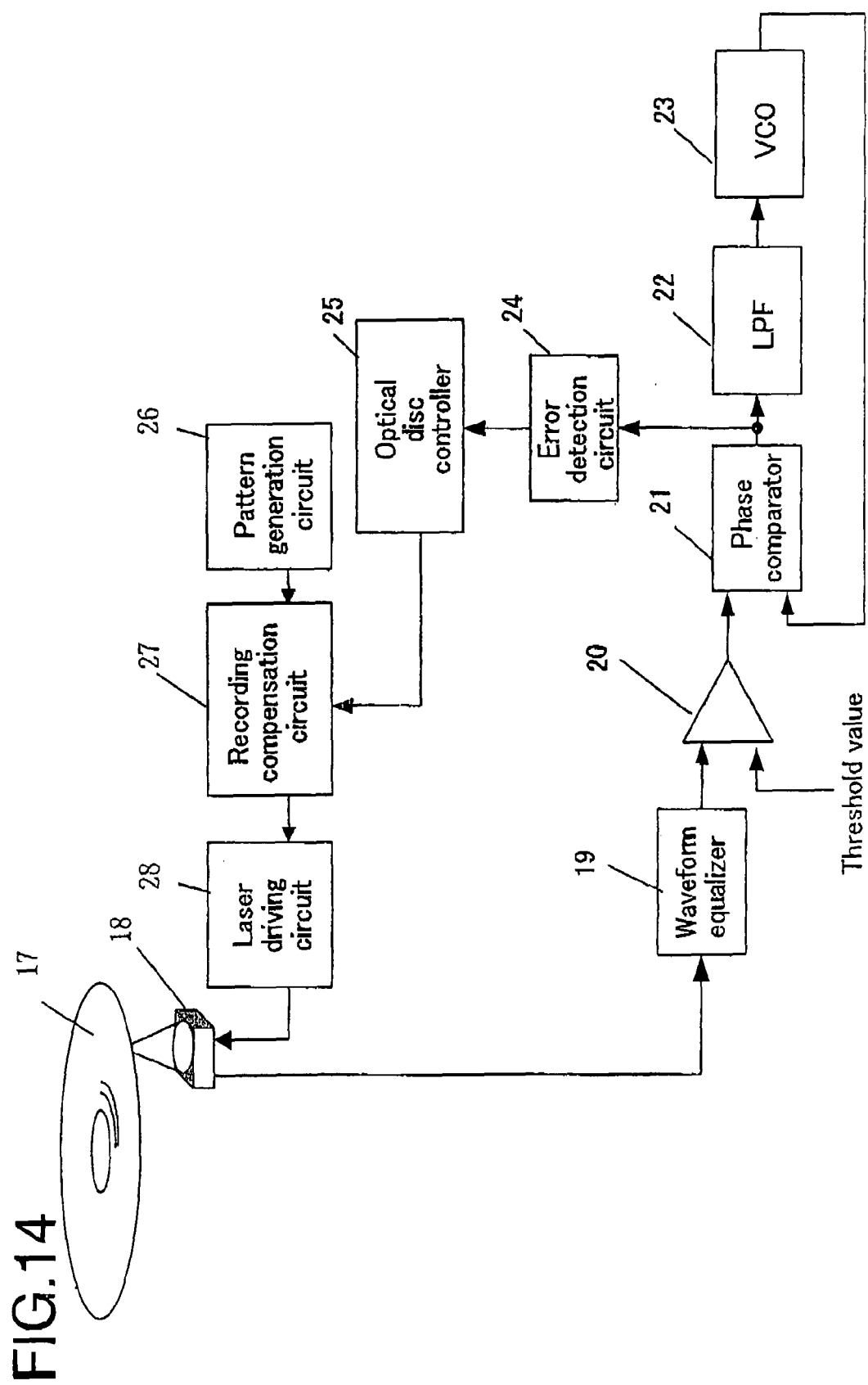
FIG. 14 shows a conventional optical disc drive.

FIG. 13 shows an edge shift detection circuit 12*a* which is a modification of the edge shift detection circuit 12. In the edge shift detection circuit 12*a*, random patterns are used for test recording. Namely, different test recording patterns are generated at different frequencies.

The pattern detection circuit 11 detects an edge of each of specific patterns (30 patterns) shown in FIG. 9. The edge shift detection circuit 12*a* accumulates the edge shift amounts corresponding to each of the patterns, and counts the number of times that each pattern has been detected. By dividing each accumulation result of the edge shift amounts with the number of times that the respective pattern has been detected, the average edge shift amount of each specific pattern is obtained. Thus, even when random patterns are used for test recording, it can be determined which is the pattern corresponding to the recording mark having the mark start edge position or the mark termination edge position which should be changed.

As described above, the edge shift detection circuit 12 included in the adjusting section 104 calculates one of is an accumulation value or an average value of the reliability of the maximum likelihood decoding result for each recording pattern (i.e., for each mark length/space length combination)

and adjusts the shape of the recording signal based on the accumulation value or average value obtained.

In the above example, the state transition rule defined by the recording symbol having a minimum polarity inversion interval of 2 and the equalization system of PR (1,2,2,1) is used by the maximum likelihood decoding section 9 for performing maximum likelihood decoding. The present invention is not limited to this. The present invention is applicable to use of, for example, a state transition rule defined by the recording symbol having a minimum polarity inversion interval of 3 and the equalization system of PR (C0,C1,C1,C0), a state transition rule defined by the recording symbol having a minimum polarity inversion interval of 2 or 3 and the equalization system of PR (C0,C1,C0), and a state transition rule defined by the recording symbol having a minimum polarity inversion interval of 2 or 3 and the equalization system of PR (C0,C1,C2,C1,C0). C0, C1 and C2 are each an arbitrary positive numeral.

Figure 17:
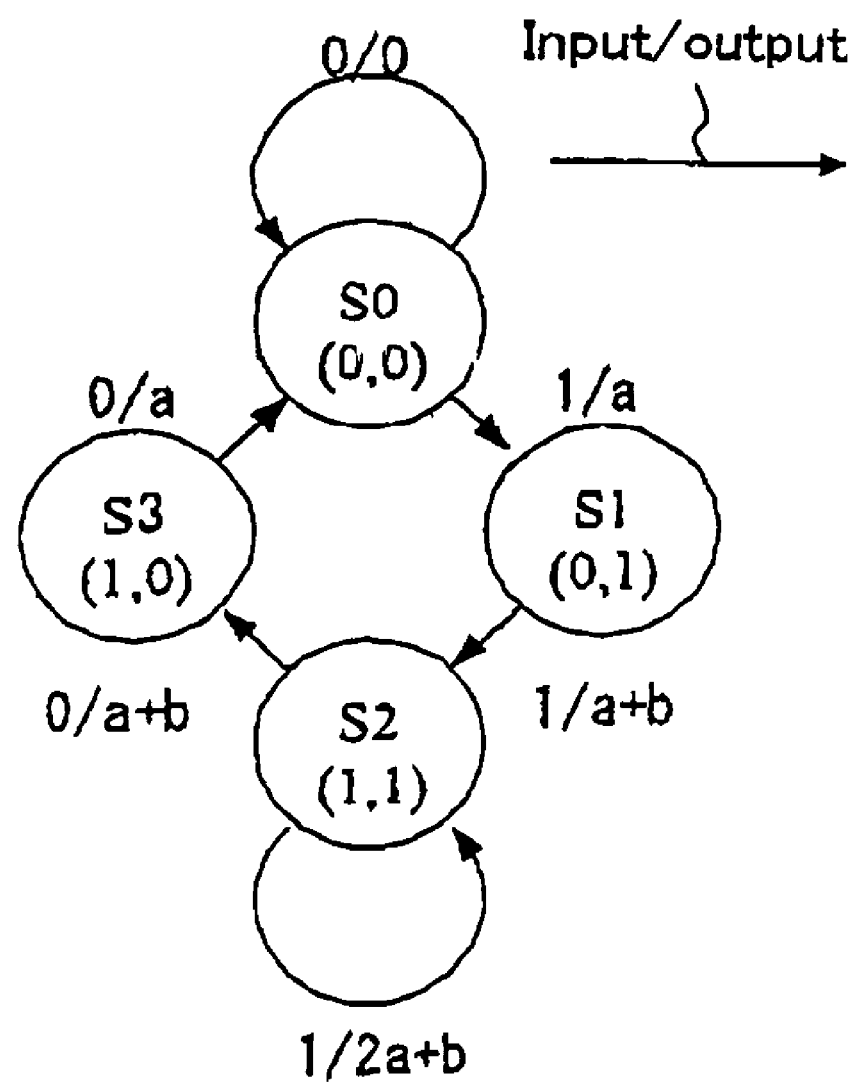
FIG. 17 shows state transition rule based on a combination of a recording symbol having a minimum polarity inversion interval of 2 and the equalization system of PR (a,b,a) according to an example of the present invention.

Table 3 shows the state transition rule defined by the recording symbol having a minimum polarity inversion interval of 2 and an equalization system of PR (a,b,a). FIG. 17 shows a state transition diagram representing the state transition rule. Here, "a" and "b" are each an arbitrary positive numeral.

TABLE 3

State transitions based on a combination of a recording symbol having a minimum polarity inversion interval of 2T and the equalization system of PR (a, b, a)

| State at time k − 1<br>$S(b_{k-3}, b_{k-2}, b_{k-1})$ | Input at time k<br>$b_k$ | Signal level |
| --- | --- | --- |
| S(0, 0) | 0 | 0 |
| S(0, 0) | 1 | a |
| S(0, 1) | 1 | a + b |
| S(1, 0) | 0 | a |
| S(1, 1) | 0 | a + b |
| S(1, 1) | 1 | 2a + b |

Figure 18:
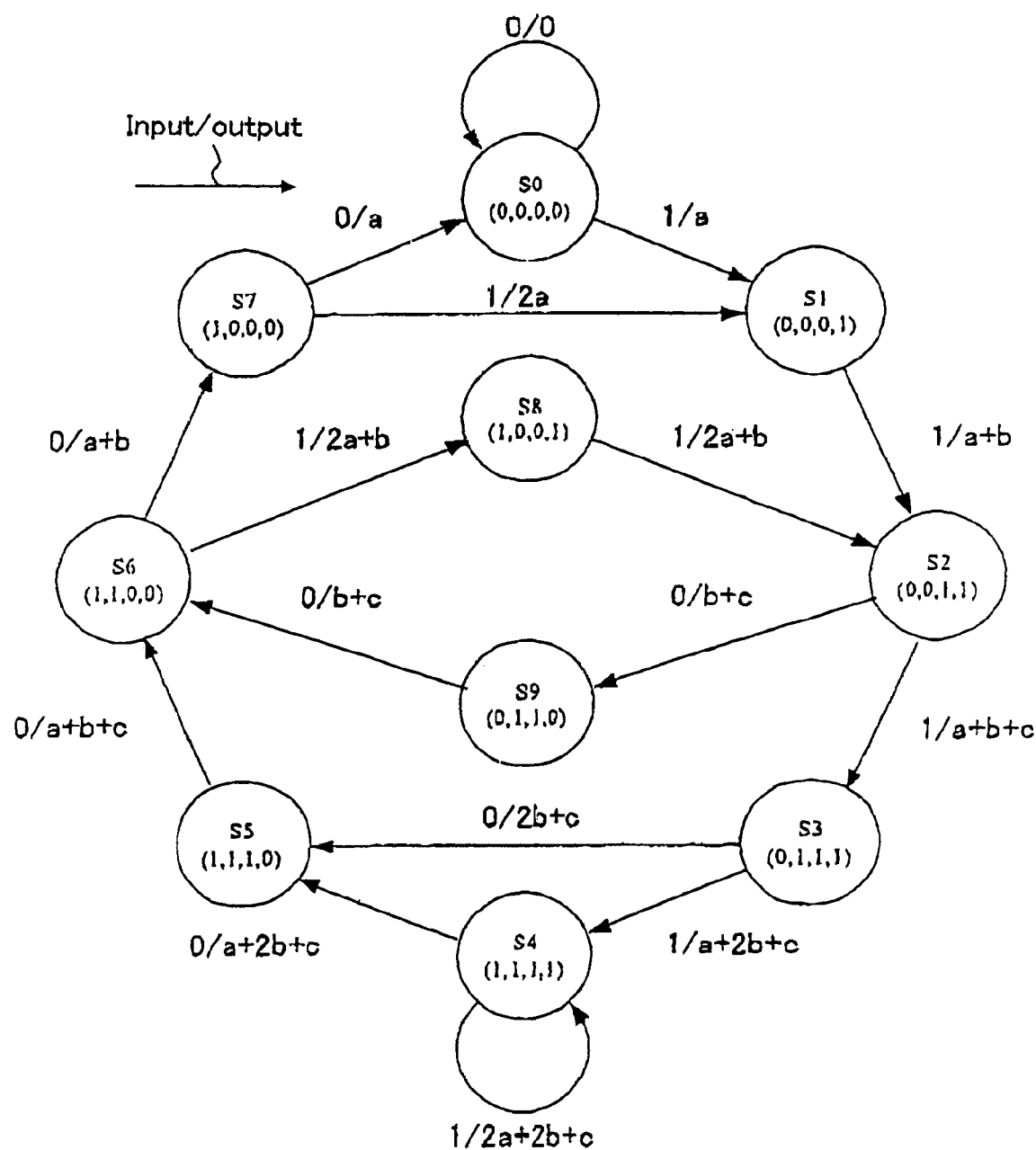
FIG. 18 shows state transition rule based on a combination of a recording symbol having a minimum polarity inversion interval of 2 and the equalization system of PR (a,b,c,b,a) according to an example of the present invention.

Table 4 shows the state transition rule defined by the recording symbol having a minimum polarity inversion interval of 2 and an equalization system of PR (a,b,c,b,a). FIG. 18 shows a state transition diagram representing the state transition rule. Here, "a", "b" and "c" are each an arbitrary positive numeral.

TABLE 4

State transitions based on a combination of a recording symbol having a minimum polarity inversion interval of 2T and the equalization system of PR (a, b, c, b, a)

| State at time k − 1<br>$S(b_{k-4}, b_{k-3}, b_{k-2}, b_{k-1})$ | Input at time k<br>$b_k$ | Signal level |
| --- | --- | --- |
| S(0, 0, 0, 0) | 0 | 0 |
| S(0, 0, 0, 0) | 1 | A |
| S(0, 0, 0, 1) | 1 | a + b |
| S(0, 0, 1, 1) | 0 | B + c |
| S(0, 0, 1, 1) | 1 | a + b + c |
| S(0, 1, 1, 0) | 0 | B + c |
| S(0, 1, 1, 1) | 0 | 2b + c |
| S(0, 1, 1, 1) | 1 | a + 2b + c |
| S(1, 0, 0, 0) | 0 | A |
| S(1, 0, 0, 0) | 1 | 2a |
| S(1, 0, 0, 1) | 1 | 2a + b |
| S(1, 1, 0, 0) | 0 | A + b |
| S(1, 1, 0, 0) | 1 | 2A + b |
| S(1, 1, 1, 0) | 0 | A + b + c |
| S(1, 1, 1, 1) | 0 | A + 2b + c |
| S(1, 1, 1, 1) | 1 | 2a + 2b + c |

The maximum likelihood decoding section 9 may perform maximum likelihood decoding using the state transition rules shown in Tables 3 and 4 and FIGS. 17 and 18.

In the above example, the recording parameter is for controlling the position of the mark start edge and the position of the mark termination edge of a recording mark. The present invention is not limited to this. In the case of performing laser light emission using a multiple pulse signal described with reference to FIG. 15, a parameter for controlling the width of a leading pulse, the width of a terminating pulse, or the width of a cooling pulse may be adjusted based on the reliability of the maximum likelihood decoding.

The elements of the recording and reproduction apparatus 100 may be implemented by hardware or software. For example, an operation performed by at least one of the rectification section 8, the maximum likelihood decoding section 9, the reliability calculation section 10, and the adjusting section 11 may be implemented by a computer-executable program.

According to the present invention, the reliability of the result of the maximum likelihood decoding is calculated based on the digital signal having the waveform thereof rectified and the binary signal generated by the maximum likelihood decoding section. Based on the calculated reliability, the shape of the recording signal for recording information on the information recording medium is adjusted. Thus, the shape of the recording signal can be adjusted so as to improve the reliability of the result of the maximum likelihood decoding, and thus the error probability at the time of maximum likelihood decoding can be reduced.

According to the present invention, a recording parameter which is optimal for the maximum likelihood decoding method is set such that the error probability is minimal when the signal is decoded using the maximum likelihood decoding method. The reliability of the result of maximum likelihood decoding is calculated for portions of a signal which correspond to a mark start edge and a mark termination edge of a recording mark and have a high error probability by the maximum likelihood decoding method. This calculation is performed for each of mark length/space length combinations. Based on the calculation result, a recording parameter for optimizing the position of the mark start edge and the position of the mark termination edge is obtained. Information recording is performed reflecting the recording parameter obtained. By optimizing the recording parameter of a portion of a recording signal having a high error probability at the time of maximum likelihood decoding, the readability of the reproduced information can be improved.

As described above, the present invention is especially useful for a recording control apparatus, a recording and reproduction apparatus, and a recording control method using the maximum likelihood decoding method.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A recording control apparatus, comprising:
a waveform rectification section for receiving a digital signal generated from an analog signal representing information reproduced from an information recording medium, and rectifying a waveform of the digital signal;

a maximum likelihood decoding section for performing maximum likelihood decoding of the digital signal having the waveform thereof rectified, and generating a binary signal representing a result of the maximum likelihood decoding;

a reliability calculation section for calculating a reliability of the result of the maximum likelihood decoding based on the digital signal having the waveform thereof rectified and the binary signal; and an adjusting section for adjusting a shape of a recording signal for recording the information on the information recording medium based on the calculated reliability.

2. A recording control apparatus according to claim 1, wherein the adjusting section adjusts a shape of a prescribed portion of the recording signal.

3. A recording control apparatus according to claim 1, wherein the adjusting section adjusts a position of an edge of the recording signal.

4. A recording control apparatus according to claim 1, wherein the maximum likelihood decoding section performs maximum likelihood decoding using a state transition rule which is defined by a recording symbol having a minimum polarity inversion interval of 2 and an equalization system PR (C0,C1,C0).

5. A recording control apparatus according to claim 1, wherein the maximum likelihood decoding section performs maximum likelihood decoding using a state transition rule which is defined by a recording symbol having a minimum polarity inversion interval of 2 and an equalization system PR (C0,C1,C1,C0).

6. A recording control apparatus according to claim 1, wherein the maximum likelihood decoding section performs maximum likelihood decoding using a state transition rule which is defined by a recording symbol having a minimum polarity inversion interval of 2 and an equalization system PR (C0,C1,C2,C1,C0).

7. A recording control apparatus according to claim 1, wherein the reliability calculation section calculates the reliability based on a digital signal corresponding to an end of a recording mark formed on the information recording medium and a binary signal.

8. A recording control apparatus according to claim 1, wherein the adjusting section adjusts the shape of the recording signal so as to improve the reliability.

9. A recording control apparatus according to claim 1, wherein the adjusting section calculates one of an accumulation value of the calculated reliability and an average value of the calculated reliability, and adjusts the shape of the recording signal based on one of the accumulation value and the average value.

10. A recording control apparatus according to claim 9, wherein the adjusting section calculates one of the accumulation value of the calculated reliability and the average value of the calculated reliability for each of combinations of a recording mark length and a space length.

11. A recording and reproduction apparatus, comprising:

a reproduction section for generating a digital signal from an analog signal representing information reproduced from an information recording medium;

a waveform rectification section for receiving the digital signal and rectifying a waveform of the digital signal;

a maximum likelihood decoding section for performing maximum likelihood decoding of the digital signal having the waveform thereof rectified, and generating a binary signal representing a result of the maximum likelihood decoding;

a reliability calculation section for calculating a reliability of the result of the maximum likelihood decoding based on the digital signal having the waveform thereof rectified and the binary signal;

an adjusting section for adjusting a shape of a recording signal for recording the information on the information recording medium based on the calculated reliability; and a recording section for recording the information on the information recording medium based on the adjusting result of the shape of the recording signal.

12. A recording control method, comprising the steps of:

receiving a digital signal generated from an analog signal representing information reproduced from an information recording medium, and rectifying a waveform of the digital signal;

performing maximum likelihood decoding of the digital signal having the waveform thereof rectified, and generating a binary signal representing a result of the maximum likelihood decoding;

calculating a reliability of the result of the maximum likelihood decoding based on the digital signal having the waveform thereof rectified and the binary signal; and adjusting a shape of a recording signal for recording the information on the information recording medium based on the calculated reliability.

13. A recording control method according to claim 12, wherein the step of adjusting includes the step of adjusting a shape of a prescribed portion of the recording signal.

14. A recording control method according to claim 12, wherein the step of adjusting includes the step of adjusting a position of an edge of the recording signal.

* * * * *